United States Patent
Okuno

(10) Patent No.: US 11,178,256 B2
(45) Date of Patent: Nov. 16, 2021

(54) BUSINESS SERVICE PROVIDING SYSTEM, BUSINESS SERVICE RECOVERY METHOD, AND BUSINESS SERVICE RECOVERY PROGRAM

(71) Applicant: NEC Corporation, Tokyo (JP)

(72) Inventor: Yusuke Okuno, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/782,182

(22) Filed: Feb. 5, 2020

(65) Prior Publication Data
US 2020/0267239 A1    Aug. 20, 2020

(30) Foreign Application Priority Data

Feb. 18, 2019  (JP) .............................. JP2019-026532

(51) Int. Cl.
| | |
|---|---|
| *H04L 29/06* | (2006.01) |
| *H04L 12/24* | (2006.01) |
| *H04L 29/08* | (2006.01) |
| *G06F 15/16* | (2006.01) |
| *G06F 11/14* | (2006.01) |
| *G06F 12/00* | (2006.01) |
| *G06F 17/00* | (2019.01) |

(52) U.S. Cl.
CPC .......... *H04L 67/42* (2013.01); *H04L 41/0893* (2013.01); *H04L 67/02* (2013.01); *H04L 67/16* (2013.01)

(58) Field of Classification Search
CPC ..... H04L 67/42; H04L 41/0893; H04L 67/16; H04L 67/02; H04L 41/5025; H04L 69/40

USPC ........................................................ 709/203
See application file for complete search history.

(56) References Cited

U.S. PATENT DOCUMENTS

| 10,282,525 B2* | 5/2019 | Kashiyama | ......... H04L 63/0807 |
|---|---|---|---|
| 2005/0257258 A1* | 11/2005 | Kinoshita | ........... H04L 67/2852 726/12 |
| 2006/0048227 A1* | 3/2006 | Ohta | ...................... G06F 21/554 726/22 |
| 2008/0077657 A1* | 3/2008 | Tagami | ............... H04L 67/1002 709/203 |

(Continued)

FOREIGN PATENT DOCUMENTS

| JP | 2003-131905 A | 5/2003 |
|---|---|---|
| JP | 2004-334684 A | 11/2004 |

*Primary Examiner* — David R Lazaro
*Assistant Examiner* — Berhanu Shitayewoldetadik
(74) *Attorney, Agent, or Firm* — Sughrue Mion, PLLC

(57) ABSTRACT

A business service providing system 1 according to an example embodiment includes a server 200 that provides a business service, a client 300 that uses the business service, and a monitoring apparatus 100 that monitors a state of the business service in the server 200 and the client 300. The monitoring apparatus 100 includes a monitoring information acquisition unit 110 that acquires monitoring information indicating the state of the business service in the server 200 and the client 300, a response policy determination unit 120 that determines a response policy for recovery of the business service based on the monitoring information in the server 200 and the client 300, and a recovery process request unit 130 that requests the server 200 or the client 300 to perform a recovery process based on the response policy.

4 Claims, 27 Drawing Sheets

(56) References Cited

U.S. PATENT DOCUMENTS

| | | | |
|---|---|---|---|
| 2008/0155563 A1* | 6/2008 | Nakamura | H04L 67/02 |
| | | | 719/318 |
| 2009/0049181 A1* | 2/2009 | Yagi | H04L 69/329 |
| | | | 709/227 |
| 2012/0030680 A1* | 2/2012 | Chang | G06F 9/5055 |
| | | | 718/102 |
| 2012/0151250 A1* | 6/2012 | Saika | G06F 11/203 |
| | | | 714/4.11 |
| 2014/0108367 A1* | 4/2014 | Kim | G06F 16/2379 |
| | | | 707/703 |
| 2015/0254125 A1* | 9/2015 | Kakui | G06F 11/3419 |
| | | | 714/47.3 |
| 2015/0281093 A1* | 10/2015 | Nishiguchi | H04L 69/40 |
| | | | 370/235 |
| 2015/0302037 A1* | 10/2015 | Jackson | G06F 16/972 |
| | | | 707/736 |
| 2017/0149864 A1* | 5/2017 | Feiman | H04L 67/10 |
| 2017/0163615 A1* | 6/2017 | Ho | H04L 63/083 |
| 2018/0150501 A1* | 5/2018 | Hattori | G06F 16/275 |
| 2019/0026184 A1* | 1/2019 | Artman | G06F 11/079 |

* cited by examiner

| SERVER | CLIENT | RESPONSE POLICY |
|---|---|---|
| NORMAL | NORMAL | NO RESPONSE REQUIRED |
| NORMAL | ABNORMAL | RECOVERY REQUEST FOR CLIENT |
| ABNORMAL | NORMAL | RECOVERY REQUEST FOR SERVER |
| ABNORMAL | ABNORMAL | RECOVERY REQUEST FOR SERVER (*) |

Fig. 4

| TREATMENT LEVEL | LEVEL 1 | LEVEL 2 | LEVEL 3 | LEVEL 4 |
|---|---|---|---|---|
| SERVER RECOVERY PROCESS | RESTART BUSINESS SERVICE PROVIDING UNIT | RESTART SERVER | REPORT TO OPERATOR | (NONE) |

| TREATMENT LEVEL | LEVEL 1 | LEVEL 2 | LEVEL 3 | LEVEL 4 |
|---|---|---|---|---|
| CLIENT RECOVERY PROCESS | RESTART BUSINESS SERVICE USING UNIT | RESTART CLIENT | REPORT TO OPERATOR | (NONE) |

| TREATMENT LEVEL | LEVEL 1 | LEVEL 2 |
|---|---|---|
| SERVER RECOVERY PROCESS | REPORT TO OPERATOR | (NONE) |

| TREATMENT LEVEL | LEVEL 1 | LEVEL 2 | LEVEL 3 |
|---|---|---|---|
| CLIENT RECOVERY PROCESS | SEND MESSAGE TO USER "PLEASE RESTART CLIENT" | REPORT TO OPERATOR  SEND MESSAGE TO USER "REPORT HAS BEEN SENT TO OPERATOR" | (NONE) |

| TREATMENT LEVEL | LEVEL 1 | LEVEL 2 | LEVEL 3 | LEVEL 4 |
|---|---|---|---|---|
| SERVER RECOVERY PROCESS | RESTART BUSINESS SERVICE PROVIDING UNIT | RESTART SERVER | REPORT TO OPERATOR | (NONE) |
| REQUIRED TIME | 60 SECONDS | 600 SECONDS | 3600 SECONDS | (NONE) |

Fig. 27

| TREATMENT LEVEL | LEVEL 1 | LEVEL 2 | LEVEL 3 | LEVEL 4 |
|---|---|---|---|---|
| CLIENT RECOVERY PROCESS | RESTART BUSINESS SERVICE USING UNIT | RESTART CLIENT | REPORT TO OPERATOR | (NONE) |
| REQUIRED TIME | 30 SECONDS | 180 SECONDS | 3600 SECONDS | (NONE) |

Fig. 32

BUSINESS SERVICE PROVIDING SYSTEM, BUSINESS SERVICE RECOVERY METHOD, AND BUSINESS SERVICE RECOVERY PROGRAM

INCORPORATION BY REFERENCE

This application is based upon and claims the benefit of priority from Japanese patent application No. 2019-026532, filed on Feb. 18, 2019, the disclosure of which is incorporated herein in its entirety by reference.

TECHNICAL FIELD

The present disclosure relates to a business service providing system, a business service recovery method, and a business service recovery program. For example, the present disclosure relates to a business service providing system, a business service recovery method, and a business service recovery program that monitor and recover a business service.

BACKGROUND ART

It is indispensable to monitor whether a system that provides business services is operating normally and to recover the system as necessary in order to provide the business services. As a method for monitoring and recovering such a system, a method for monitoring the system from the perspective of a server that provides the business service is commonly used. For example, there are methods such as "monitoring whether there is a process of a business service running on the server" or "monitoring whether the server itself can connect to a business service running on the server". By "monitoring network communication between the server and a network router or the like" together with the above-listed method for monitoring the system, the server providing the business service is monitored whether the server is isolated from the network.

For example, Japanese Unexamined Patent Application Publication No. 2003-131905 discloses external monitoring and internal monitoring for a server on a network. The external monitoring in Japanese Unexamined Patent Application Publication No. 2003-131905 is a method in which some kind of monitoring apparatus is installed in a server, and when a failure occurs in the server, the monitoring apparatus sends a failure notification to an external designated destination. The internal monitoring in Japanese Unexamined Patent Application Publication No. 2003-131905 is, for example, a method for continuously monitoring a system state of the server, and when the system state reaches a limit value, a server administrator or the like is warned, and performing automatic recovery when a failure occurs.

Japanese Unexamined Patent Application Publication No. 2004-334684 discloses a method in which a monitoring apparatus periodically requests a monitored apparatus (server) to answer, receives the answer indicating normality or abnormality, and sends a report to a predetermined contact when there is a difference between content of a previous response and that of the received response.

However, monitoring from the perspective of a server is insufficient to determine whether a business service is operating normally. It is necessary to check that the service is available as the entire system constituting the business service. Specifically, only the above-mentioned "monitoring whether there is a process of a business service running on the server", "monitoring whether the server itself can connect to a business service running on the server", and "monitoring network communication between the server and a network router or the like" are insufficient from the perspective of a "client terminal that uses the business service". For this reason, when some kind of a failure occurs in the client (even when the business service is operating normally on the server), the client cannot use the business service.

As described above, when there is a failure in a device other than the server that provides the business service among the components related to the business service, appropriate monitoring and recovery cannot be provided.

SUMMARY

In light of the above-described problem, an object of the present disclosure is to provide a business service providing system, a business service recovery method, and a business service recovery program that can achieve appropriate monitoring and recovery according to a device in which a failure has occurred even when the failure has occurred in a device other than a server that provides a business service among components constituting the business service.

In an example aspect, a business service providing system includes: a server apparatus configured to provide a business service; a client apparatus configured to use the business service; and a monitoring apparatus configured to monitor a state of the business service in the server apparatus and the client apparatus. The monitoring apparatus includes: a monitoring information acquisition unit configured to acquire monitoring information indicating the state of the business service in the server apparatus and the client apparatus; a response policy determination unit configured to determine a response policy for recovery of the business service based on the monitoring information in the server apparatus and the client apparatus, the monitoring information being output from the monitoring information acquisition unit; and a recovery process request unit configured to request one of the server apparatus and the client apparatus to perform a process based on the response policy output from the response policy determination unit.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 4 shows an example of a response policy referred to by a response policy determination unit in the business service providing system according to the first example embodiment;

FIG. 27 shows an example of recovery processes for a server and required times corresponding to treatment levels in the business service providing system according to the third example embodiment;

FIG. 32 shows an example of recovery processes and required times corresponding to treatment levels in the business service providing system according to the third example embodiment;

EMBODIMENTS

First Example Embodiment

Figure 1:
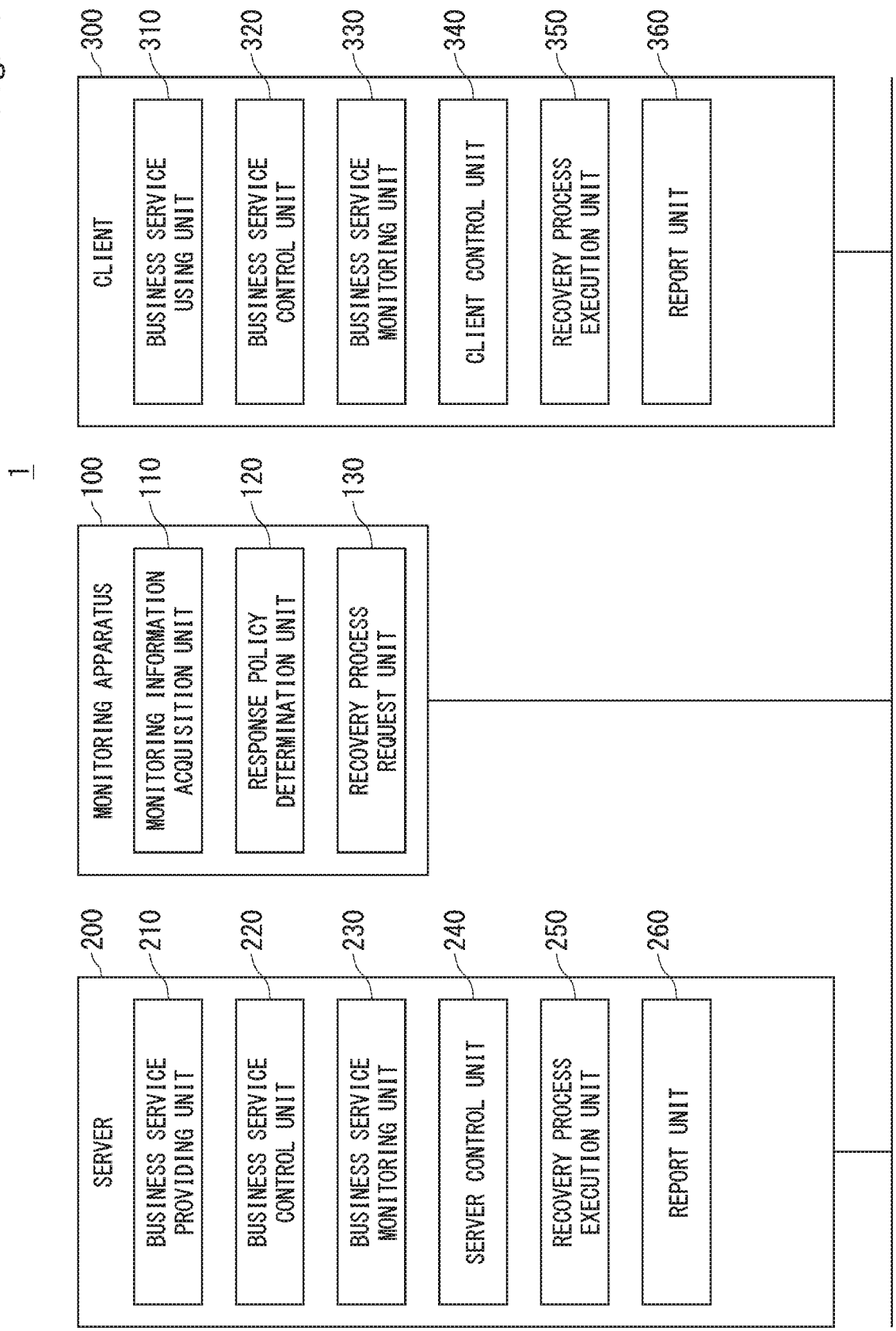
FIG. 1 is a block diagram showing a configuration of a business service providing system according to a first example embodiment.

A business service providing system according to a first example embodiment will be described. FIG. 1 is a block diagram showing an example of a business service providing system according to a first example embodiment. As shown in FIG. 1, the business service providing system 1 includes a monitoring apparatus 100, a server apparatus 200, and a client apparatus 300. The server apparatus 200 is simply referred to as a server 200, and the client apparatus 300 is simply referred to as a client 300. The monitoring apparatus 100, the server 200, and the client 300 are connected to each other in a manner that they can exchange information wirelessly or via wired lines. The server 200 provides a business service. The client 300 uses the business service via a network. The monitoring apparatus 100 monitors a state of the business service in the server 200 and the client 300.

The monitoring apparatus 100 includes a monitoring information acquisition unit 110, a response policy determination unit 120, and a recovery process request unit 130.

The monitoring information acquisition unit 110 acquires monitoring information from the server 200 and the client 300 and transmits the acquired monitoring information to the response policy determination unit 120. The monitoring information indicates the state of the business service in the server 200 and the client 300, for example, whether the business service is in a normal state or an abnormal state.

The response policy determination unit 120 determines a response policy for recovering the business service based on the monitoring information about the server 200 and the client 300 output from the monitoring information acquisition unit 110. Specifically, the response policy determination unit 120 checks the monitoring information transmitted from the monitoring information acquisition unit 110. When the state of any of the apparatuses is an abnormal state, the response policy determination unit 120 determines a response policy for recovery and transmits the determined response policy to the recovery process request unit 130.

The recovery process request unit 130 requests the server 200 or the client 300 to perform a recovery process based on the response policy output from the response policy determination unit 120. Specifically, the recovery process request unit 130 requests the server 200 and the client 300 to perform a recovery process in accordance with an instruction from the response policy determination unit 120. The recovery process request unit 130 holds a "previous response policy", a "treatment level", and a "previous recovery request time" as internal information. The monitoring apparatus 100 includes, for example, a microcomputer and a memory.

The server 200 includes the business service providing unit 210, a business service control unit 220, a business service monitoring unit 230, a server control unit 240, a recovery process execution unit 250, and a report unit 260.

The business service providing unit 210 provides the business service. Examples of the business service include an e-mail service, and a Web server. The business service control unit 220 controls the business service providing unit 210 to start, stop, restart, etc. The business service monitoring unit 230 monitors the business service providing unit 210. Then, the business service monitoring unit 230 determines a state of the business service providing unit 210. The state of the business service providing unit 210 is, for example, whether it is operating normally or it is in an abnormal state.

The server control unit 240 controls the server 200 itself to start, stop, restart, etc. The recovery process execution unit 250 executes recovery of the business service that can be carried out on the server 200 side in accordance with a request from the recovery process request unit 130 in the monitoring apparatus 100. The recovery process execution unit 250 issues an instruction to any one of the business service control unit 220, the server control unit 240, and the report unit 260 according to content of the recovery process. The report unit 260 reports an abnormal state of the business service to an operator of the business service. The operator of the business service is, for example, an operation manager of a system.

The client 300 includes a business service using unit 310, a business service control unit 320, a business service monitoring unit 330, a client control unit 340, a recovery process execution unit 350, and a report unit 360.

The business service using unit 310 communicates with the business service providing unit 210 of the server 200 to enable a user to use the business service. The business service control unit 320 controls the business service using unit 310 to start, stop, restart, etc. The business service monitoring unit 330 monitors the business service providing unit 310. Then, the business service monitoring unit 330 determines the state of the business service providing unit 310. The state of the business service providing unit 310 is, for example, whether it is operating normally or it is in an abnormal state.

The client control unit 340 controls the client 300 itself to start, stop, restart, etc. The recovery process execution unit 350 determines a recovery process in the client 300 in accordance with a request from the recovery process request unit 130 in the monitoring apparatus 100. Then, the recovery process execution unit 350 requests the business service control unit 320, the client control unit 340, or the report unit 360 to perform processing based on the determined recovery process. That is, the recovery process execution unit 350 executes possible recovery of the business service. The recovery process execution unit 350 issues an instruction to any one of the business service control unit 320, the client control unit 340, and the report unit 360 according to content of the recovery process. The report unit 360 has similar functions as those of the report unit 260 of the server 200. That is, the report unit 360 reports an abnormal state of the business service to the operator of the business service.

<Acquisition of Monitoring Information>

Figure 2:
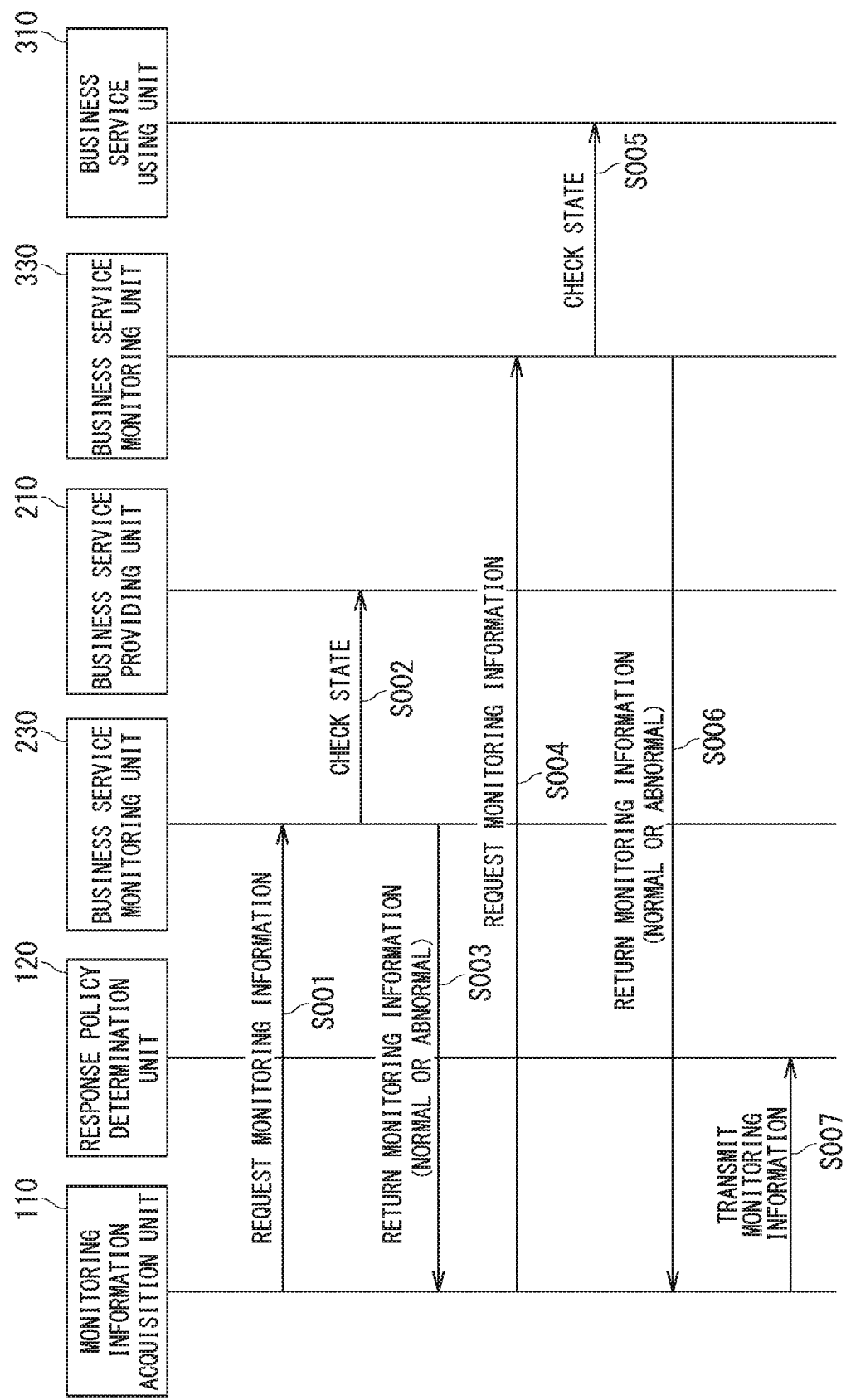
FIG. 2 is a sequence diagram showing acquisition of monitoring information in the business service providing system according to the first example embodiment.

Next, an operation of the business service providing system 1 according to this example embodiment will be described. FIG. 2 is a sequence diagram showing an example of acquisition of the monitoring information in the business service providing system according to the first example embodiment.

As shown in Step S001 of FIG. 2, the monitoring information acquisition unit 110 requests the business service monitoring unit 230 of the server 200 for the monitoring information. In response to this request, as shown in Step S002, the business service monitoring unit 230 checks the state of the business service providing unit 210. As a method for checking the state of the business service providing unit 210, the business service monitoring unit 230 attempts to establish a connection with the business service, and when the connection is successfully established, it determines as "normal", while when the connection is failed, it determines as "abnormal". For example, when the business service is an e-mail service, the business service monitoring unit 230 attempts to establish a connection using the protocol such as POP3, IMAP4, or SMTP. When the business service is a Web server, the business service monitoring unit 230 attempts to establish a connection using HTTP.

Next, as shown in Step S003, the business service monitoring unit 230 returns a result of checking the state ("normal" or "abnormal") in Step S002 to the monitoring information acquisition unit 110. In this way, the monitoring information acquisition unit 110 can acquire the monitoring information of the server 200.

Further, as shown in Step S004, the monitoring information acquisition unit 110 requests the business service monitoring unit 330 of the client 300 for the monitoring information. In response to this request, as shown in Step S005, the business service monitoring unit 330 checks the state of the business service using unit 310.

As a method for checking the state of the business service using unit 310, a display output and a user input (keyboard operation, mouse operation, touch panel operation, etc.) of the business service in the client 300 are continuously monitored. When a change in the display output of the business service can be observed while there is a user input, it is determined as "normal", whereas when a change in the display output of the business service cannot be observed for a certain period of time, it is determined as "abnormal".

Next, as shown in Step S006, the business service monitoring unit 330 returns a result of checking the state in Step S005 ("normal" or "abnormal") to the monitoring information acquisition unit 110. In this way, the monitoring information acquisition unit 110 can acquire the monitoring information of the client 300.

As shown in Step S007, the monitoring information acquisition unit 110 transmits the monitoring information (normal or abnormal) acquired in Step S003 and S006 to the response policy determination unit 120. The processing from Step S001 to Step S007 is periodically repeated.

<Determination of Response Policy and Request for Recovery Process in Abnormal State>

Figure 3:
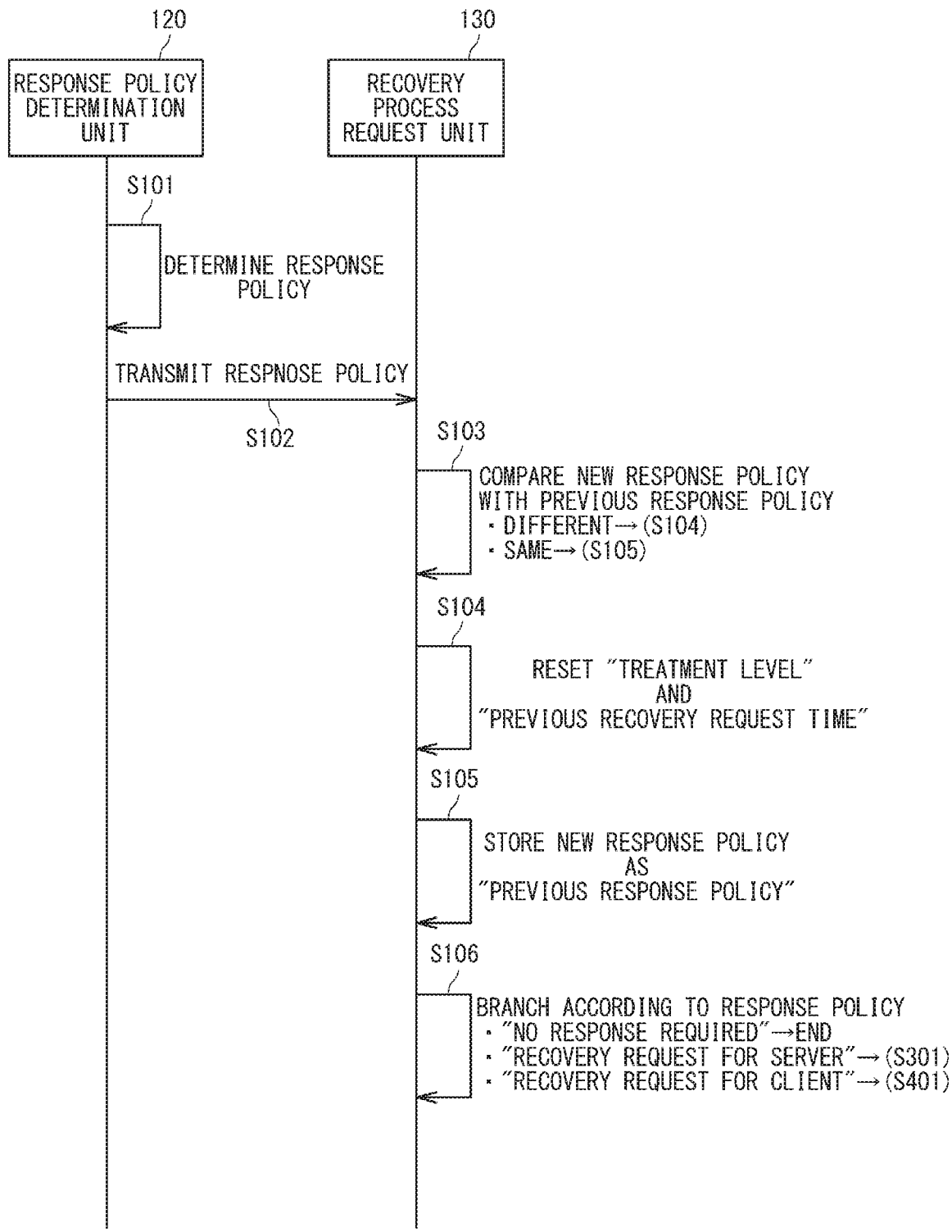
FIG. 3 is a sequence diagram showing an example of determination of a response policy and a request for a recovery process in an abnormal state in the business service providing system according to the first example embodiment.

Next, determination of a response policy in an abnormal state and a request for a recovery process will be described. FIG. 3 is a sequence diagram showing an example of determination of a response policy and a request for a recovery process in an abnormal state in the business service providing system according to the first example embodiment. FIG. 4 shows an example of a response policy referred to by the response policy determination unit in the business service providing system according to the first example embodiment.

As shown in Step S101 of FIG. 3, the response policy determination unit 120 determines a response policy with reference to the received monitoring information. At this time, the determination is made based on the response policy shown in FIG. 4. As shown in FIG. 4, when the monitoring information is "Server: Normal, Client: Normal", the response policy determination unit 120 determines "Response not required" as the response policy. When the monitoring information is "Server: Normal, Client: Abnormal", the response policy determination unit 120 determines "Recovery request for client" as the response policy. When the monitoring information is "Server: Abnormal, Client: Normal" and "Server: Abnormal, Client: Abnormal", the response policy determination unit 120 determines "Recovery request for server" as the response policy.

When the monitoring information is "Server: Abnormal, Client: Abnormal", the abnormality of the client may be affected by the abnormality of the server. For this reason, only the "Recovery request for server (*)" is issued without issuing "Recovery request for client". If the monitoring information is changed to "Server: Normal, Client: Abnormal" indicating that the abnormality of the client continues even when the server recovers to a normal state as a result of recovering the server, the response policy of "Recovery request for client" is now employed.

Next, as shown in Step S102, the response policy determination unit 120 transmits the determined response policy to the recovery process request unit 130. The determined response policy is one of "Response not required", "Recovery request for server", and "Recovery request for client". In response to this request, as shown in Step S103, the recovery process request unit 130 compares the newly received response policy with the previous response policy. An initial value of the response policy is "Response not required".

When the newly received response policy differs from the previous response policy, the process proceeds to Step S104. When the newly received response policy is the same as the previous response policy, the process proceeds to Step S105.

In Step S104, the recovery process request unit 130 resets the stored "treatment level" to 0 and "previous recovery request time" to none. As will be described later, a plurality of recovery processes for the server 200 and the client 300 are classified into respective levels. A plurality of classified recovery process levels are referred to as treatment levels. Therefore, the treatment levels are classified into, for example, levels 1 to 4. In Step S105, the recovery process request unit 130 stores the newly received response policy as the "previous response policy".

Next, as shown in Step S106, the recovery process request unit 130 determines which of the following steps to proceed in accordance with the newly received response policy. That is, when the received response policy is "Response not required", the process is ended. When the received response policy is "Recovery request for server", the process proceeds to Step S301. When the received response policy is "Recovery request for client", the process proceeds to Step S401.

When the server 200 or the client 300 is recovered to a normal state by the recovery process described later, the "treatment level" and the "previous recovery request time" are reset in the operations of Step S103 and Step S104. The same operation is performed when the response policy changes from "Recovery request for server" to "Recovery request for client" or from "Recovery request for client" to "Recovery request for server".

<Server Recovery Process>

Figure 5:
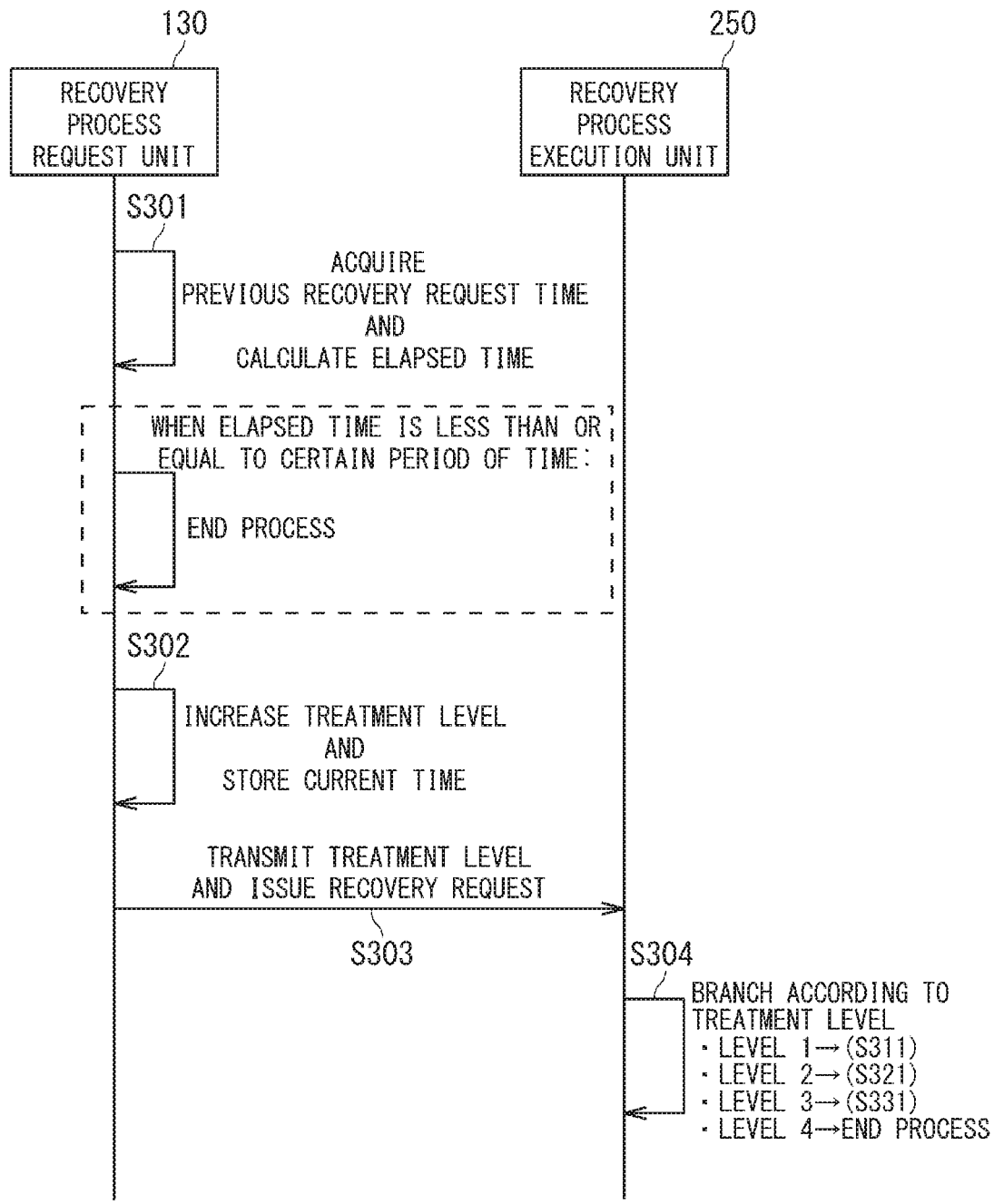
FIG. 5 is a sequence diagram showing an example of a recovery process for a server in the business service providing system according to the first example embodiment.

Next, the recovery process for the server will be described. FIG. 5 is a sequence diagram showing a recovery process for the server in the business service providing system according to the first example embodiment.

As shown in Step S301 in FIG. 5, the recovery process request unit 130 acquires the "previous recovery request time", compares it with the current time, and calculates an elapsed time. When the elapsed time exceeds a certain period of time, the process proceeds to Step S302. The certain period of time is, for example, 300 seconds. When the certain period of time has not elapsed, the process is ended. When there is no "previous recovery request time", it is determined that there is no need to calculate the elapsed time, and the process proceeds to Step S302. Note that the reason why it is determined whether the certain period of time has elapsed in this way is to consider the point that it takes time until the effect of the recovery process is seen.

Next, as shown in Step S302, the recovery process request unit 130 increases the "treatment level" by one and stores the current time as the "previous recovery request time". Here, when the newly received response policy differs from the previous response policy, the treatment level is 1, because the treatment level has been reset to 0. On the other hand, when the newly received response policy is the same as the previous response policy, the treatment level is increased by one from the previous treatment level. That is, when the same response policy continues, the recovery process request unit 130 increases the treatment levels classified for the respective plurality of recovery processes.

Next, as shown in Step S303, the recovery process request unit 130 transmits a recovery request at the current "treatment level" to the recovery process execution unit 250 of the server 200. As shown in Step S304, the recovery process execution unit 250 of the server 200 checks the "treatment level" of the received recovery request. Then, the recovery process execution unit 250 executes the recovery process defined in FIG. 6.

Figures 6, 7:
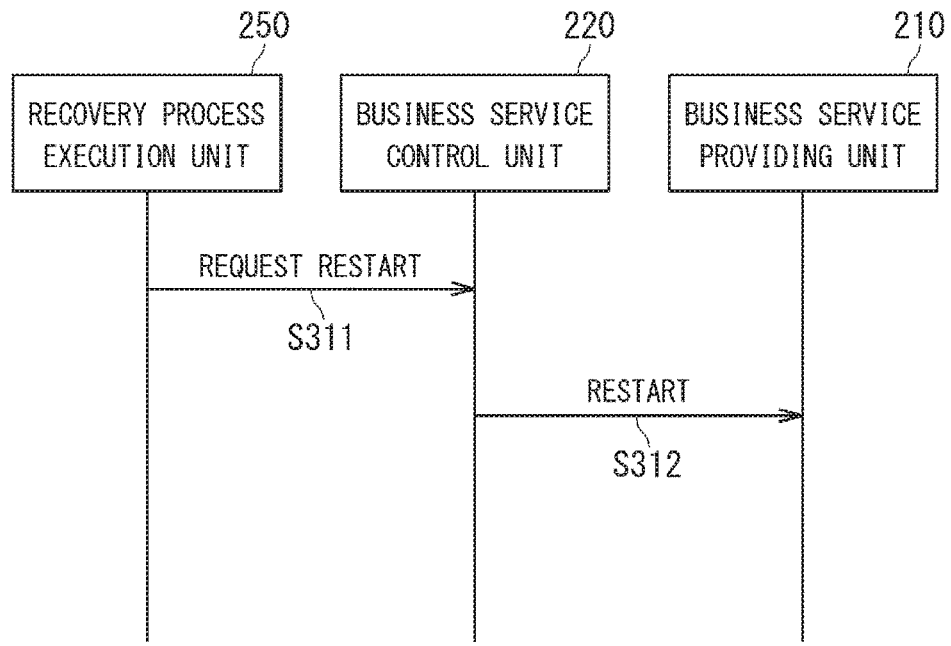
FIG. 6 shows an example of a recovery process corresponding to a treatment level in the business service providing system according to the first example embodiment.
FIG. 7 is a sequence diagram showing an example of a recovery process for a server in the business service providing system according to the first example embodiment.

FIG. 6 shows an example of the recovery processes corresponding to the treatment levels in the business service providing system according to the first example embodiment. As shown in FIG. 6, for example, the recovery process for the server 200 at the level 1 is set to "Restart business service providing unit". The recovery process for the server 200 at the level 2 is set to "Restart server". The recovery process for the server 200 at the level 3 is set to "Report to operator". The recovery process for the server 200 at the level 4 is set to "(None)". When the response policy is the level 1 "Restart business service providing unit", the process proceeds to Step S311. When the response policy is the level 2 "Restart server", the process proceeds to Step S321. When the response policy is the level 3 "Report to operator", the process proceeds to Step S331. When the response policy is the level 4 "(None)", the process is ended without performing any process.

FIG. 7 is a sequence diagram showing the recovery process for the server in the business service providing system according to the first example embodiment. In the recovery process for the server 200, when the treatment level is the level 1, the recovery process execution unit 250 requests a restart of the business service providing unit 210 to the business service control unit 220, as shown in Step S311 of FIG. 7. In response to this request, as shown in Step S312, the business service control unit 220 restarts the business service providing unit 210. Then, the process is ended.

Figure 8:
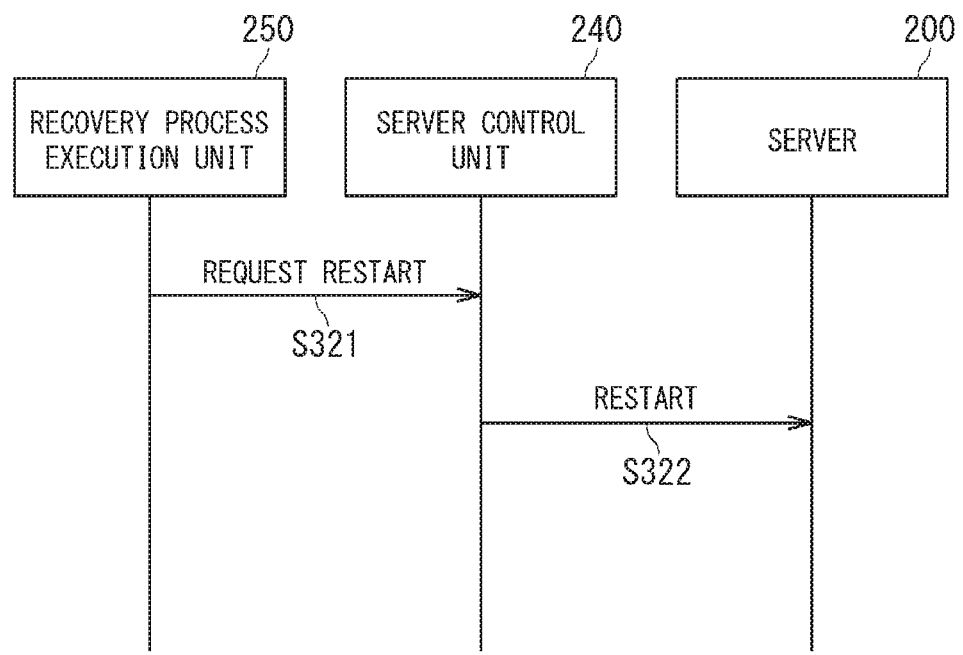
FIG. 8 is a sequence diagram showing an example of a recovery process for a server in the business service providing system according to the first example embodiment.

FIG. 8 is a sequence diagram showing the recovery process for the server in the business service providing system according to the first example embodiment. In the recovery process for the server 200, when the treatment level is the level 2, the recovery process execution unit 250 requests a restart of the server 200 to the server control unit 240, as shown in Step S321 of FIG. 8. In response to this request, the server control unit 240 restarts the server 200 as shown in Step S322. Then, the process is ended.

Figure 9:
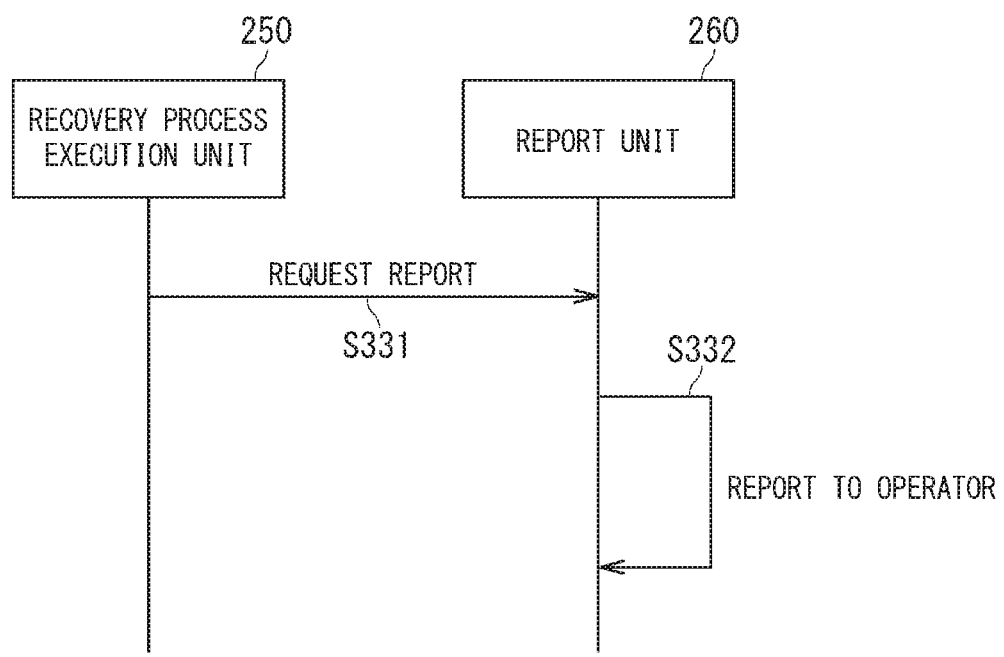
FIG. 9 is a sequence diagram showing an example of a recovery process for a server in the business service providing system according to the first example embodiment.

FIG. 9 is a sequence diagram showing the recovery process for the server in the business service providing system according to the first example embodiment. In the recovery process for the server 200, when the treatment level is the level 3, the recovery process execution unit 250 requests the report unit 260 to report to the operator as shown in Step S331 of FIG. 9. In response to this request, as shown in Step S332, the report unit 260 reports an abnormality of the business service to the operator by means such as a transmission of an e-mail or lighting of a warning light (revolving light). Then, the process is ended.

<Client Recovery Process>

Figures 10, 11:
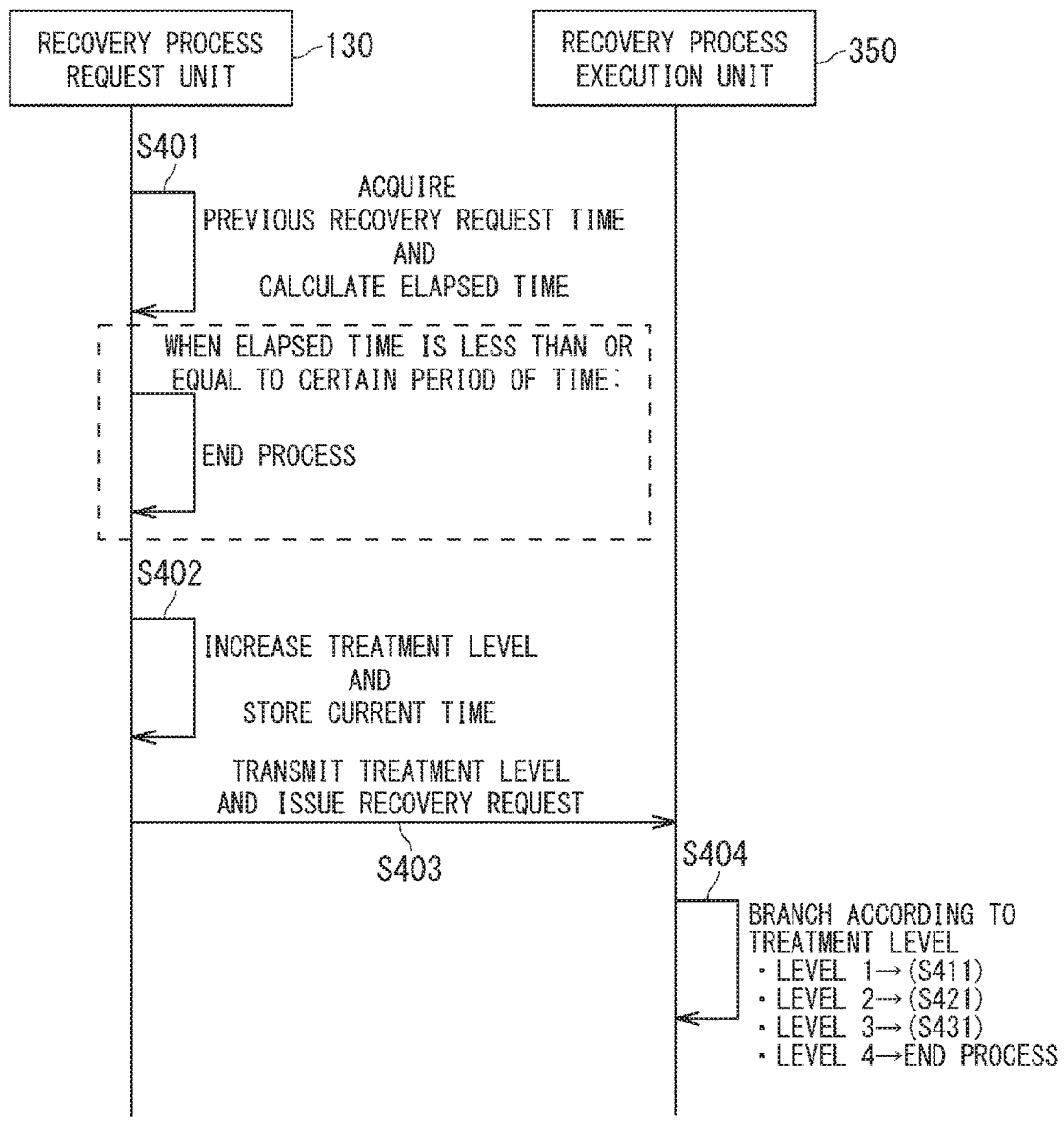
FIG. 10 is a sequence diagram showing an example of a recovery process for a client in the business service providing system according to the first example embodiment.
FIG. 11 shows an example of a recovery process corresponding to a treatment level in the business service providing system according to the first example embodiment.

Next, the recovery process for the client 300 will be described. The flow of the recovery process for the client is basically the same as that for the server 200. FIG. 10 is a sequence diagram showing the recovery process for the client in the business service providing system according to the first example embodiment.

As shown in Step S401 in FIG. 10, the recovery process request unit 130 acquires the "previous recovery request time", compares it with the current time, and calculates an elapsed time. When the elapsed time exceeds a certain period of time, the process proceeds to Step S402. The certain period of time is, for example, 300 seconds. When the certain period of time has not elapsed, the process is ended. When there is no "previous recovery request time", it is determined that there is no need to calculate the elapsed time, and the process proceeds to Step S402.

As shown in Step S402, the recovery process request unit 130 increases the "treatment level" by one and stores the current time as the "previous recovery request time". Here, when the newly received response policy differs from the previous response policy, the treatment level is 1, because the treatment level has been reset to 0. On the other hand, when the newly received response policy is the same as the previous response policy, the treatment level is increased by one from the previous treatment level. That is, when the same response policy continues, the recovery process request unit 130 increases the treatment levels classified for the respective plurality of recovery processes.

Next, as shown in Step S403, the recovery process request unit 130 transmits a recovery request at the current "treatment level" to the recovery process execution unit 350 of the client 300. In response to this request, as shown in Step S404, the recovery process execution unit 350 of the client 300 checks the "treatment level" of the received recovery request. Then, the recovery process execution unit 350 executes the recovery process defined in FIG. 11.

FIG. 11 shows an example of the recovery processes corresponding to the treatment levels in the business service providing system according to the first example embodiment. As shown in FIG. 11, for example, the recovery process for the client 300 at the level 1 is set to "Restart business service using unit". The recovery process for the client 300 at the level 2 is set to "Restart client". The recovery process for the client 300 at the level 3 is set to "Report to operator". The recovery process for the server 200 at the level 4 is set to "(None)".

When the response policy is the level 1 "Restart business service using unit", the process proceeds to Step S411. When the response policy is the level 2 "Restart client", the process proceeds to Step S421. When the response policy is the level 3 "Report to operator", the process proceeds to Step S431. When the response policy is the level 4 "(None)", the process is ended without performing any process.

Figure 12:
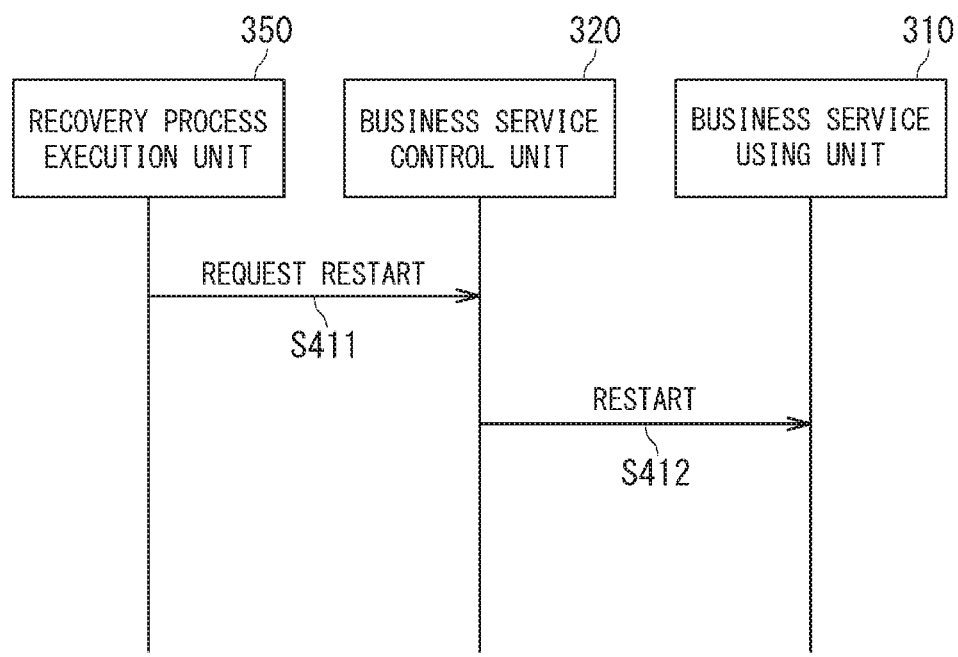
FIG. 12 is a sequence diagram showing an example of a recovery process for a client in the business service providing system according to the first example embodiment.

FIG. 12 is a sequence diagram showing the recovery process for the client in the business service providing system according to the first example embodiment. In the recovery process for the client 300, when the treatment level is the level 1, the recovery process execution unit 350 requests a restart of the business service using unit 310 to the business service control unit 320, as shown in Step S411 of FIG. 12. In response to this request, as shown in Step S412, the business service control unit 320 restarts the business service using unit 310. Then, the process is ended.

Figure 13:
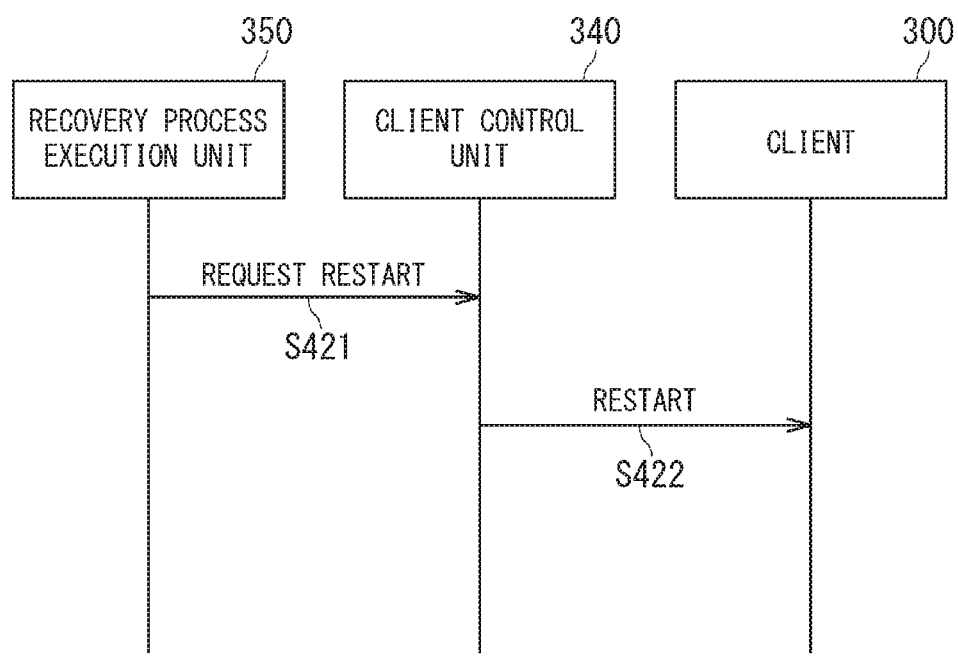
FIG. 13 is a sequence diagram showing an example of a recovery process for a client in the business service providing system according to the first example embodiment.

FIG. 13 is a sequence diagram showing the recovery process for the client in the business service providing system according to the first example embodiment. In the recovery process for the client 300, when the treatment level is the level 2, the recovery process execution unit 350 requests a restart of the client 300 to the client control unit 340, as shown in Step S421 of FIG. 13. In response to this request, the client control unit 340 restarts the client 300 as shown in Step S422. Then, the process is ended.

Figures 14, 15, 16:
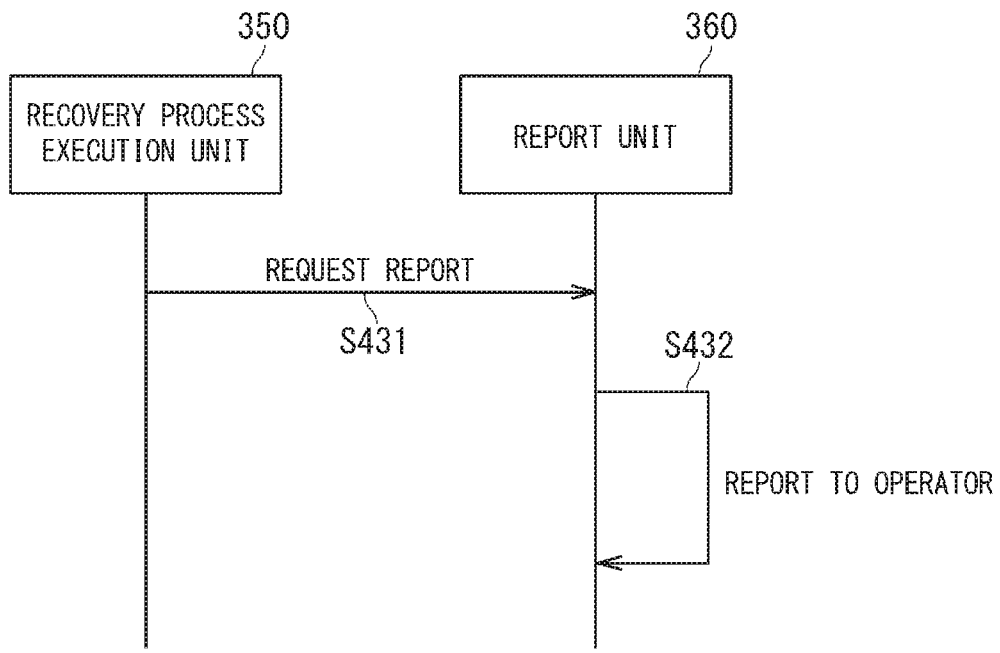
FIG. 14 is a sequence diagram showing an example of a recovery process for a client in the business service providing system according to the first example embodiment.
FIG. 15 shows an example of a recovery process corresponding to a treatment level in a business service providing system according to a second example embodiment.
FIG. 16 shows an example of a recovery process corresponding to a treatment level in the business service providing system according to the second example embodiment.

FIG. 14 is a sequence diagram showing the recovery process for the client in the business service providing system according to the first example embodiment. In the recovery process for the client 300, when the treatment level is the level 3, the recovery process execution unit 350 requests the report unit 360 to send a report to the operator as shown in Step S431 of FIG. 14. In response to this request, as shown in Step S432, the report unit 360 reports an abnormality of the business service to the operator by means such as a transmission of an e-mail or lighting of a warning light (revolving light). Then, the process is ended.

Next, the effect of this example embodiment will be described. In the business service providing system according to this example embodiment, the monitoring apparatus 100 acquires the monitoring information indicating the state of business service in the server 200 and the client 300. Therefore, even when there is a failure in a device other than the server that provides the business service among the components related to the business service, appropriate monitoring and recovery can be achieved according to the device in which the failure has occurred.

For example, even in a situation where the client 300 is operating normally, there may be a case where the client 300 is apparently affected by a failure of the server 200 and the client 300 also performs an abnormal operation. For such a case, instead of individually monitoring the state of each component and executing a recovery operation, it is necessary to determine what sort of recovery operation should be performed in order to make the entire system be in a normal state, in consideration of the state of the entire business service providing system 1 composed of the respective components.

In this example embodiment, the response policy determination unit 120 determines the response policy in consideration of the state of the entire business service providing system 1 composed of the respective components, such as when the server 200 is normal and the client 300 is abnormal, or when the server 200 is abnormal and the client 300 is normal. It is thus possible to achieve appropriate monitoring and recovery.

Further, the recovery process request unit of the monitoring apparatus 100 executes the recovery process corresponding to the treatment level. For example, when the same response policy continues, a recovery process corresponding to the increased treatment level that is classified into one of the plurality of recovery processes is executed. By doing so, appropriate monitoring and recovery can be achieved for each component of the server 200 and the client 300 related to the business service, thereby improving the availability of the entire business service.

The treatment level of the recovery process is increased, for example, beginning from restarting the business service providing unit 210 and the business service using unit 310, and the restarting the server 200 and the client 300, and finally reporting to the operator. In this manner, appropriate recovery corresponding to the treatment level can be executed.

Second Example Embodiment

Next, a business service providing system according to a second example embodiment will be described. In this example embodiment, the definitions of the recovery process for the server 200 and the client 300 are changed.

The content of the recovery processes shown in FIGS. 6 and 11 is changed to conform to the characteristics and operation policy of the business service. For example, when a failure of the server 200 is detected, it may be desirable to promptly perform manual recovery by an operator. Such desire may be achieved by defining the recovery processes to be executed by the recovery process execution unit 250 of the server 200 as shown in FIG. 15.

FIG. 15 shows an example of the recovery processes corresponding to the treatment levels in the business service providing system according to the second example embodiment. As shown in FIG. 15, the recovery process for the server 200 at the treatment level 1 is set to "Report to operator". The recovery process for the server 200 at the treatment level 2 is "(None)". In this way, manual recovery by the operator can be carried out promptly.

Further, in the recovery process for the client 300 mentioned in the above-described Steps S401 to S432, a process such as restarting is forcibly executed. However, when such a recovery process is performed while the user is actually using the business service on the client 300, there is a concern that the user may be dissatisfied or confused. The concern on the user can be reduced by executing the recovery process in accordance with the table shown in FIG. 16.

FIG. 16 shows an example of the recovery processes corresponding to the treatment levels in the business service providing system according to the second example embodiment. As shown in FIG. 16, the recovery process for the client 300 at the treatment level 1 is set to "Send message to user "please restart client"". The recovery process for the client 300 at the treatment level 2 is set to "Report the operator, report to the user "Report has been sent to operator"". The recovery process for the client 300 at the treatment level 3 is set to "(None)".

Figure 17:
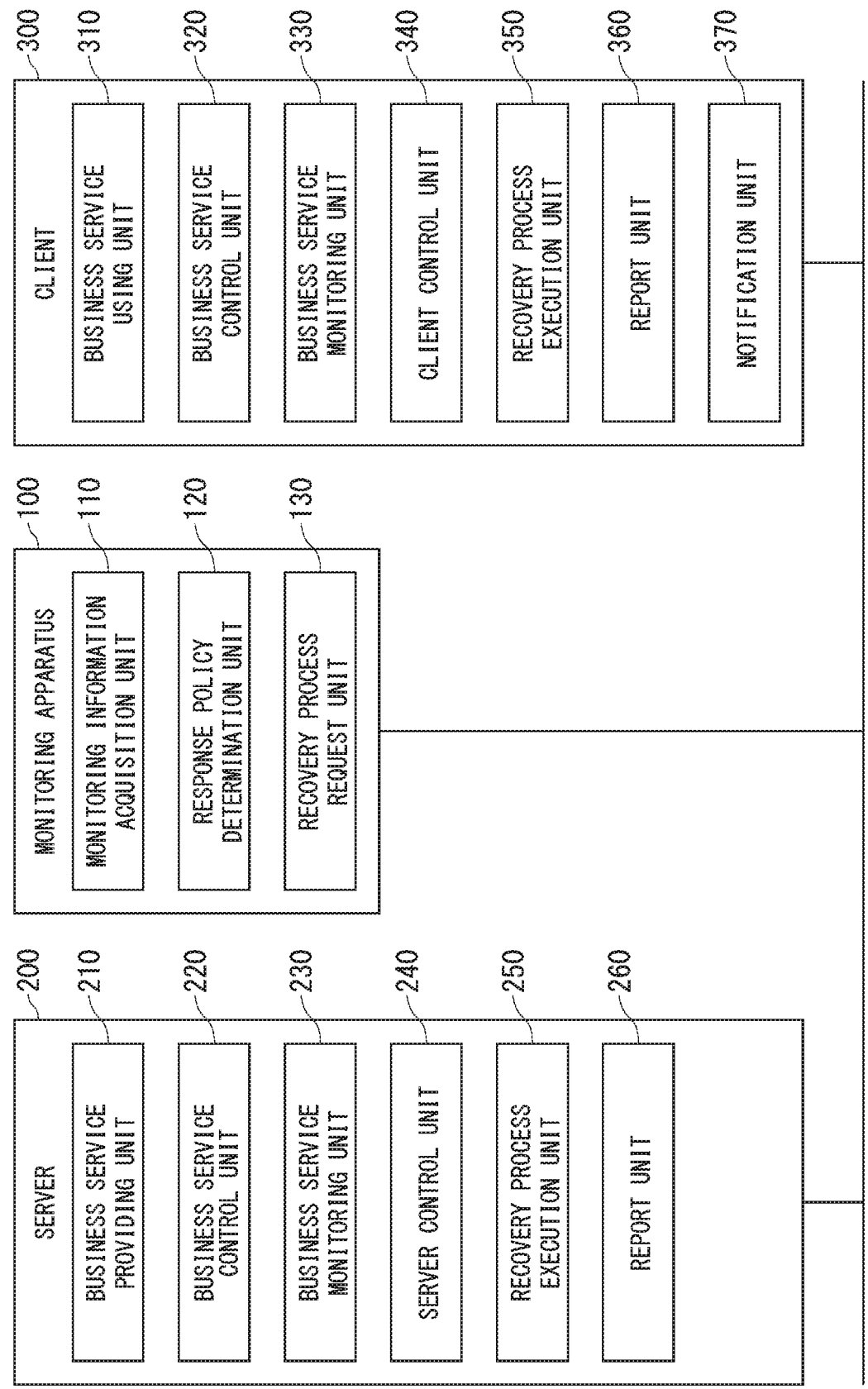
FIG. 17 is a block diagram showing a configuration of a business service providing system according to a second example embodiment.

Next, a configuration of the business service providing system according to this example embodiment will be described. FIG. 17 is a block diagram showing a configuration of the business service providing system according to the second example embodiment. As shown in FIG. 17, the business service providing system 2 according to this example embodiment further includes a notification unit 370 in the client 300. The notification unit 370 has a function of sending a message (such as a text display or a voice on a screen) to the user of the client 300. The recovery process execution unit 350 requests the notification unit 370 to perform processing based on the determined recovery process. Other than this function, the configuration of the business service providing system according to the second example embodiment is the same as that of the business service providing system 1 according to the first example embodiment.

Figure 18:
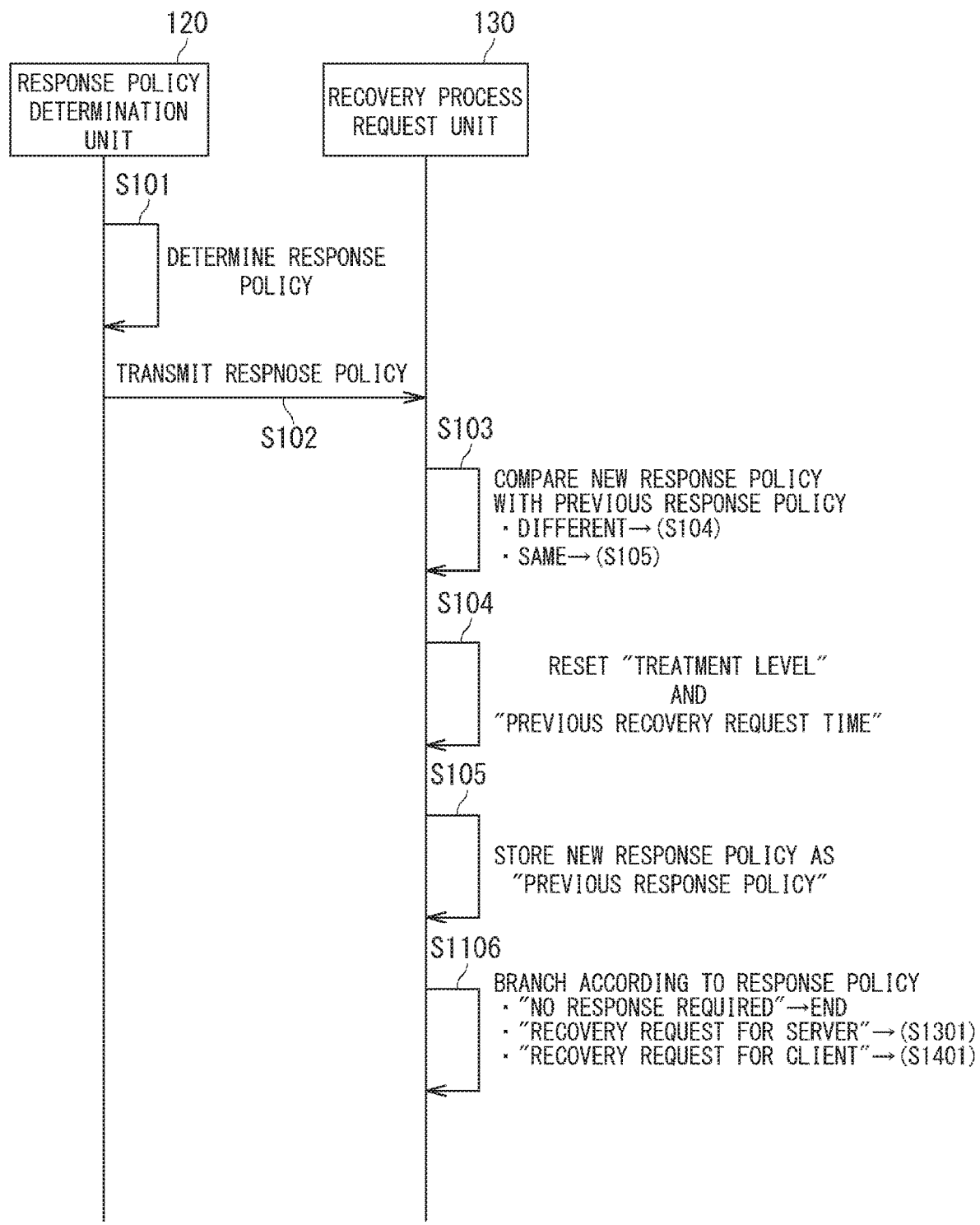
FIG. 18 is a sequence diagram showing an example of determination of a response policy and a request for a recovery process in an abnormal state in the business service providing system according to the second example embodiment.

Next, an operation of the business service providing system according to this example embodiment will be described. The monitoring information shown in FIG. 2 is acquired in the same manner as that in the first example embodiment. FIG. 18 is a sequence diagram showing an example of determination of a response policy and a request for a recovery process in an abnormal state in the business service providing system according to the second example embodiment. In FIG. 18, Step 106 in FIG. 3 is replaced with Step S1106.

As shown in Step S1106 of FIG. 18, the recovery process request unit 130 determines which of the following steps to proceed in accordance with the newly received response policy. That is, when the received response policy is "Response not required", the process is ended. When the received response policy is "Recovery request for server", the process proceeds to Step S1301. When the received response policy is "Recovery request for client", the process proceeds to Step S1401.

Figure 19:
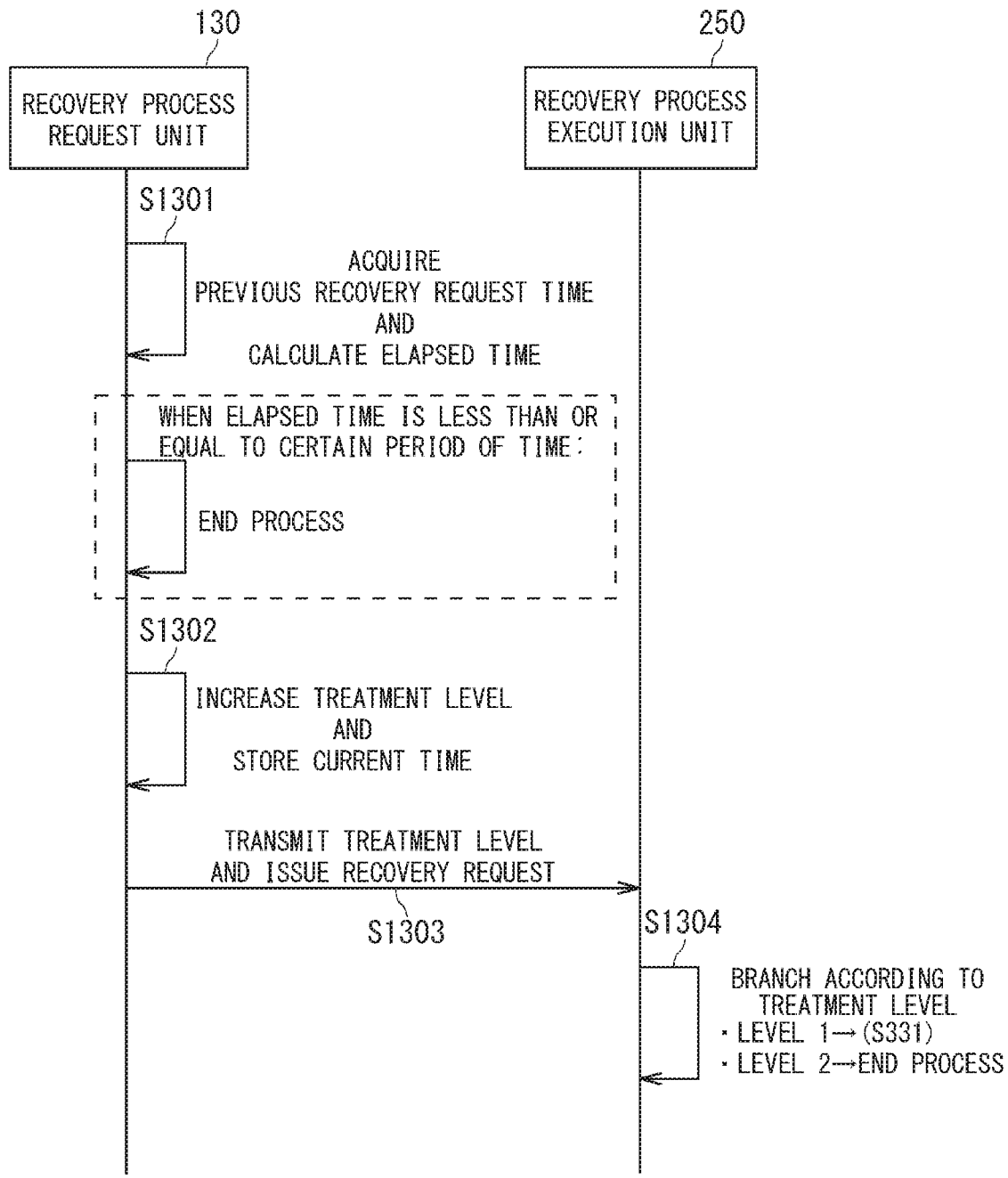
FIG. 19 is a sequence diagram showing an example of a recovery process for a server in the business service providing system according to the second example embodiment.

FIG. 19 is a sequence diagram showing an example of the recovery process for the server in the business service providing system according to the second example embodiment. FIG. 19 shows the process in which operation content of the process shown in FIG. 5 is modified according to this example embodiment. Step S304 in FIG. 5 is replaced with Step S1304 in FIG. 19. Note that Steps S1301, S1302, and S1303 in FIG. 19 have the same content as that of Steps S301, S302, and S303 in FIG. 5, respectively.

As shown in Step S1304 of FIG. 19, the recovery process execution unit 250 of the server 200 checks the "treatment level" of the received recovery request. Then, the recovery process defined in FIG. 15 is executed. That is, when the response policy is the level 1 "Report to the operator", the process proceeds to Step S331. When the response policy is the level 2 "(None)", the process is ended without performing any process. Since the operations in Step S331 and Step S332 shown in FIG. 9 are not changed, descriptions of these operations are omitted.

Figure 20:
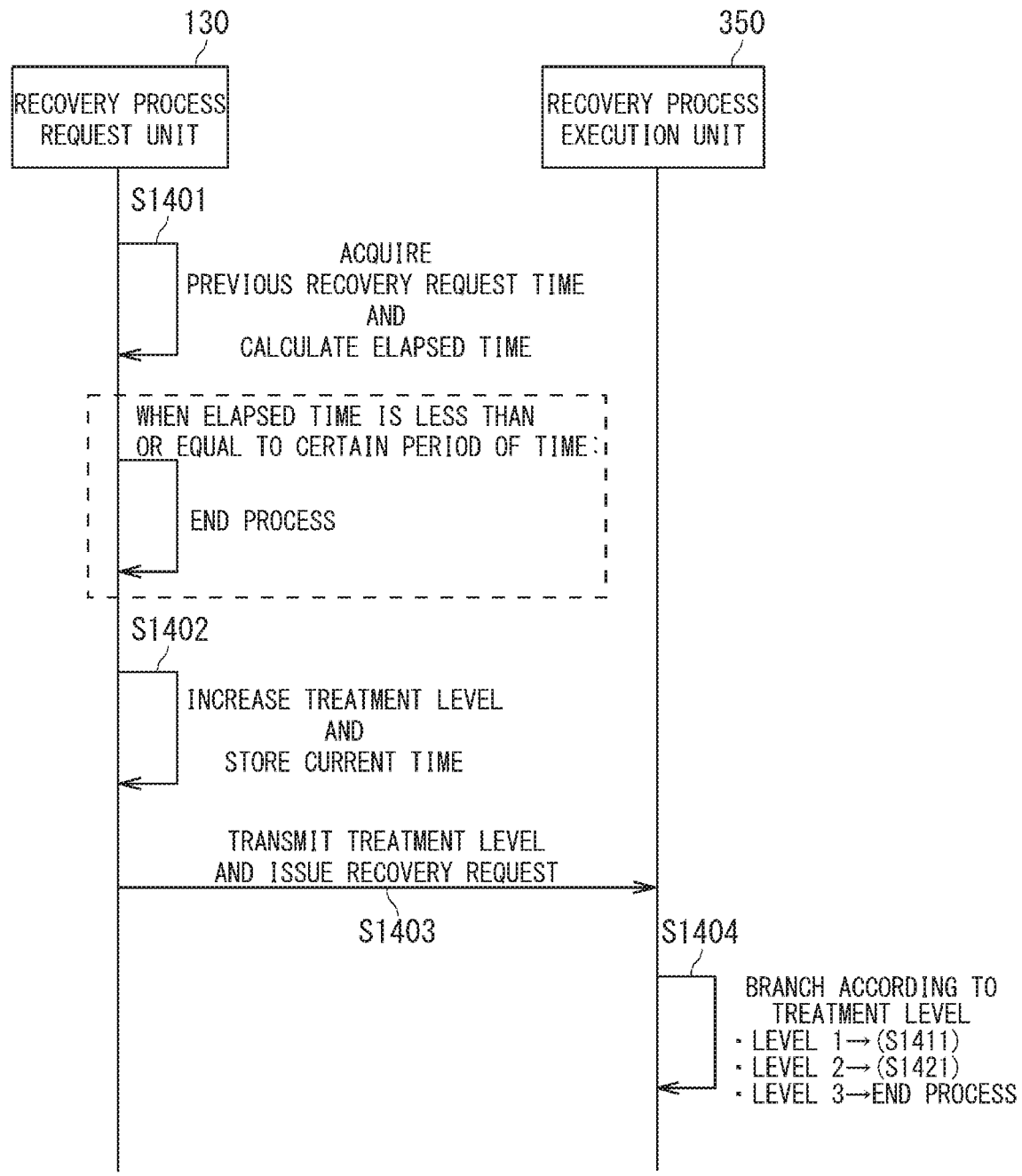
FIG. 20 is a sequence diagram showing an example of a recovery process for a client in the business service providing system according to the second example embodiment.

FIG. 20 is a sequence diagram showing an example of the recovery process for the client in the business service providing system according to the second example embodiment. FIG. 20 shows the process in which operation content of the process shown in FIG. 10 is modified according to this example embodiment. More specifically, Step S404 in FIG. 10 is replaced with Step S1404 in FIG. 20. Note that Steps S1401, S1402, and S1403 in FIG. 20 have the same content as that of Steps S401, S402, and S403 in FIG. 10, respectively.

As shown in Step S1404 of FIG. 20, the recovery process execution unit 350 of the client 300 checks the "treatment level" of the received recovery request. Then, the recovery process defined in FIG. 16 is executed. That is, when the response policy is the level 1 "Send message to user", the process proceeds to Step S1411. When the response policy is the level 2 "Report to operator, and send message to user", the process proceeds to Step S1421. When the response policy is the level 3 "(None)", the process is ended without performing any process.

Figure 21:
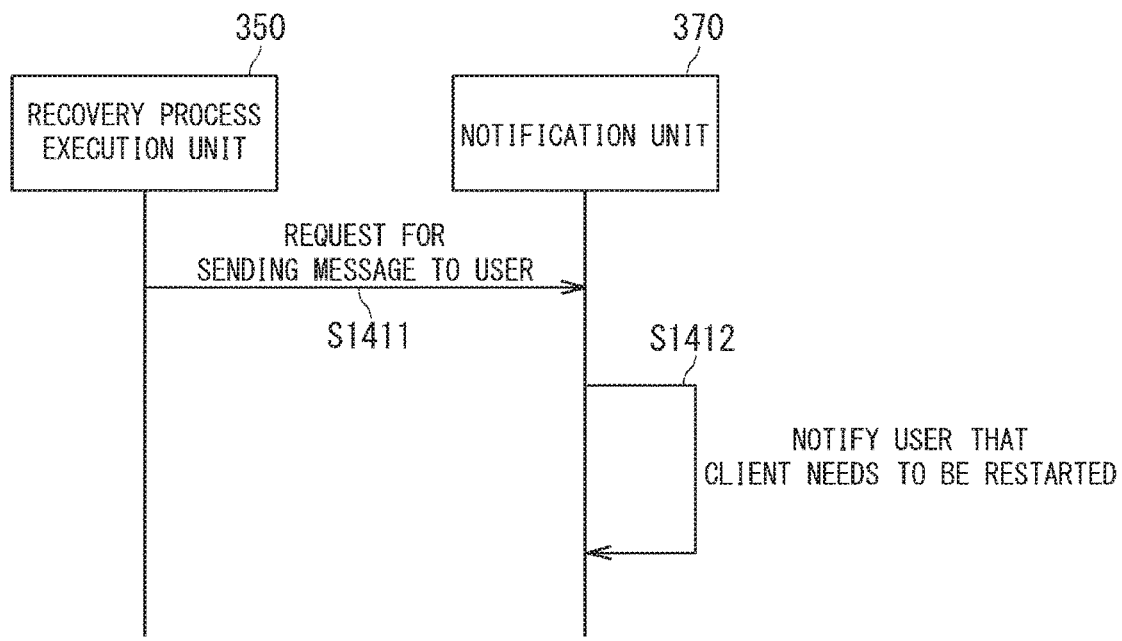
FIG. 21 is a sequence diagram showing an example of a recovery process for a client in the business service providing system according to the second example embodiment.

FIG. 21 is a sequence diagram showing an example of the recovery process for the client in the business service providing system according to the second example embodiment. In the recovery process for the client 300, when the treatment level is 1, as shown in Step S1411 of FIG. 21, the recovery process execution unit 350 requests the notification unit 370 to send a message to the user that "client needs to be restarted due to a failure occurring in client". In response to this request, as shown in Step S1412, the notification unit 370 sends a message to the user that "client needs to be restarted due to a failure occurring in client", and then ends the process. Note that means such as a text output on a screen and a voice output is used as a method for the notification.

Figure 22:
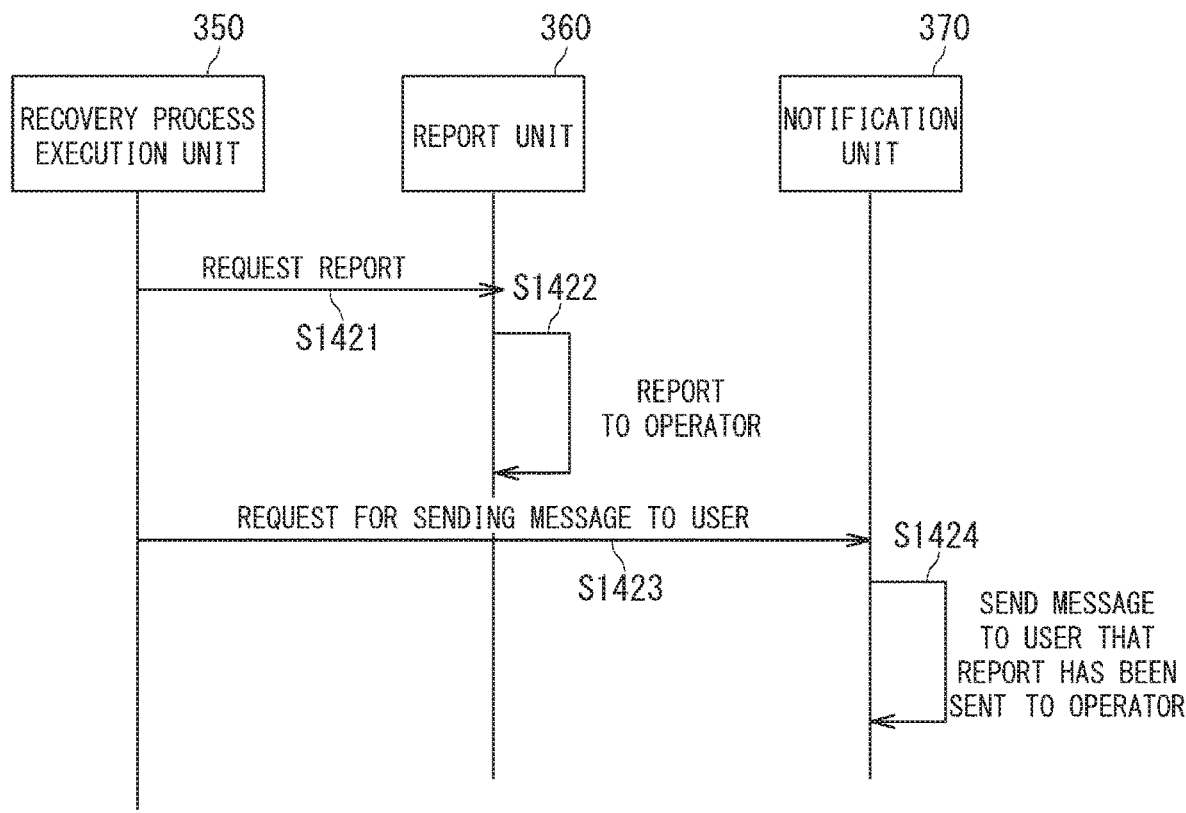
FIG. 22 is a sequence diagram showing an example of a recovery process for a client in the business service providing system according to the second example embodiment.

FIG. 22 is a sequence diagram showing the recovery process for the client in the business service providing system according to the second example embodiment. In the recovery process for the client 300, when the treatment level is 2, the recovery process execution unit 350 requests the report unit 360 to send a report to the operator as shown in Step S1421 in FIG. 22. In response to this request, as shown in Step S1422, the report unit 360 reports an abnormality of the business service to the operator by means such as a transmission of an e-mail or lighting of a warning light (revolving light). Further, as shown in Step S1423, the recovery process execution unit 350 requests the notification unit 370 to send a message to the user that "Operator has been notified of failure occurring in client". In response to this request, as shown in Step S1424, the notification unit 370 sends a message to the user that "Operator has been notified of failure occurring in client", and the process is ended.

Next, the effect of this example embodiment will be described. In this example embodiment, the content of the recovery process can be changed, and thus an optimal recovery process according to the characteristics of the business service and the operation policy can be performed.

Furthermore, instead of forcibly restarting the client 300, a message is sent to the user of the client 300. By doing so, it is possible to reduce concerns such as dissatisfaction and confusion that may be given to the user who is using the business service on the client 300. The effects other than the above-described effect are described in the first example embodiment.

Third Example Embodiment

Next, a business service providing system according to a third example embodiment will be described. In the first example embodiment, for example, the determination of whether the certain period of time has elapsed in Step S301 of FIG. 5 is based on the calculation of "single certain period of time". However, it is natural to think that a time required until the effect of the recovery process is exerted varies depending on the content of the recovery process. For this reason, when a required time can be set for each recovery process, a series of recovery processes can be performed more efficiently.

Figure 23:
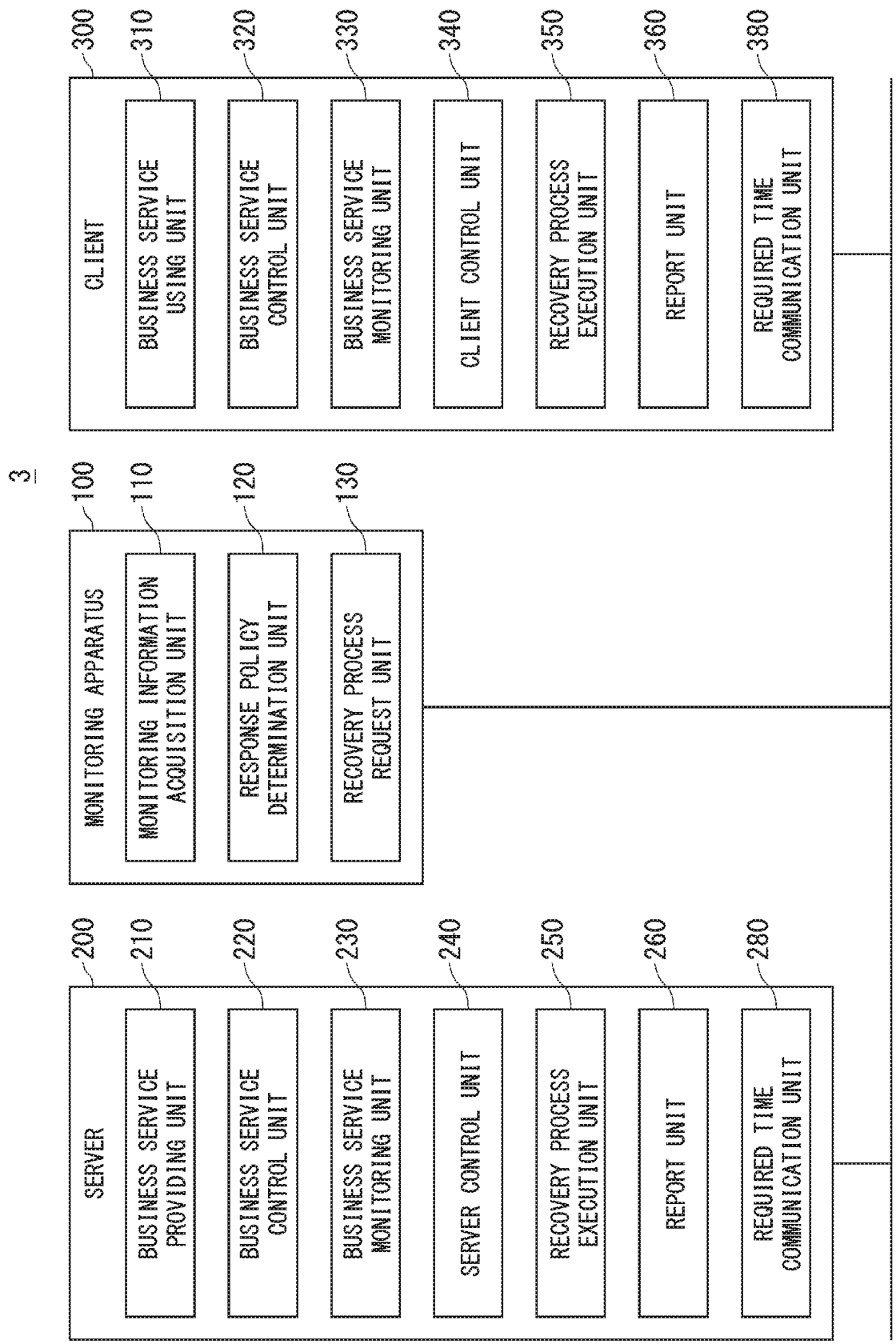
FIG. 23 is a block diagram showing a configuration of a business service providing system according to a third example embodiment.

FIG. 23 is a block diagram showing an example of a configuration of the business service providing system according to the third example embodiment. As shown in FIG. 23, a business service providing system 3 according to this example embodiment further includes a required time communication unit 280 in the server 200. In addition, the business service providing system 3 further includes a required time communication unit 380 in the client 300. The required time communication unit 280 and the required time communication unit 380 have a function of transmitting a required time for recovery to the recovery process request unit 130. The required time corresponds to the treatment level.

Figure 24:
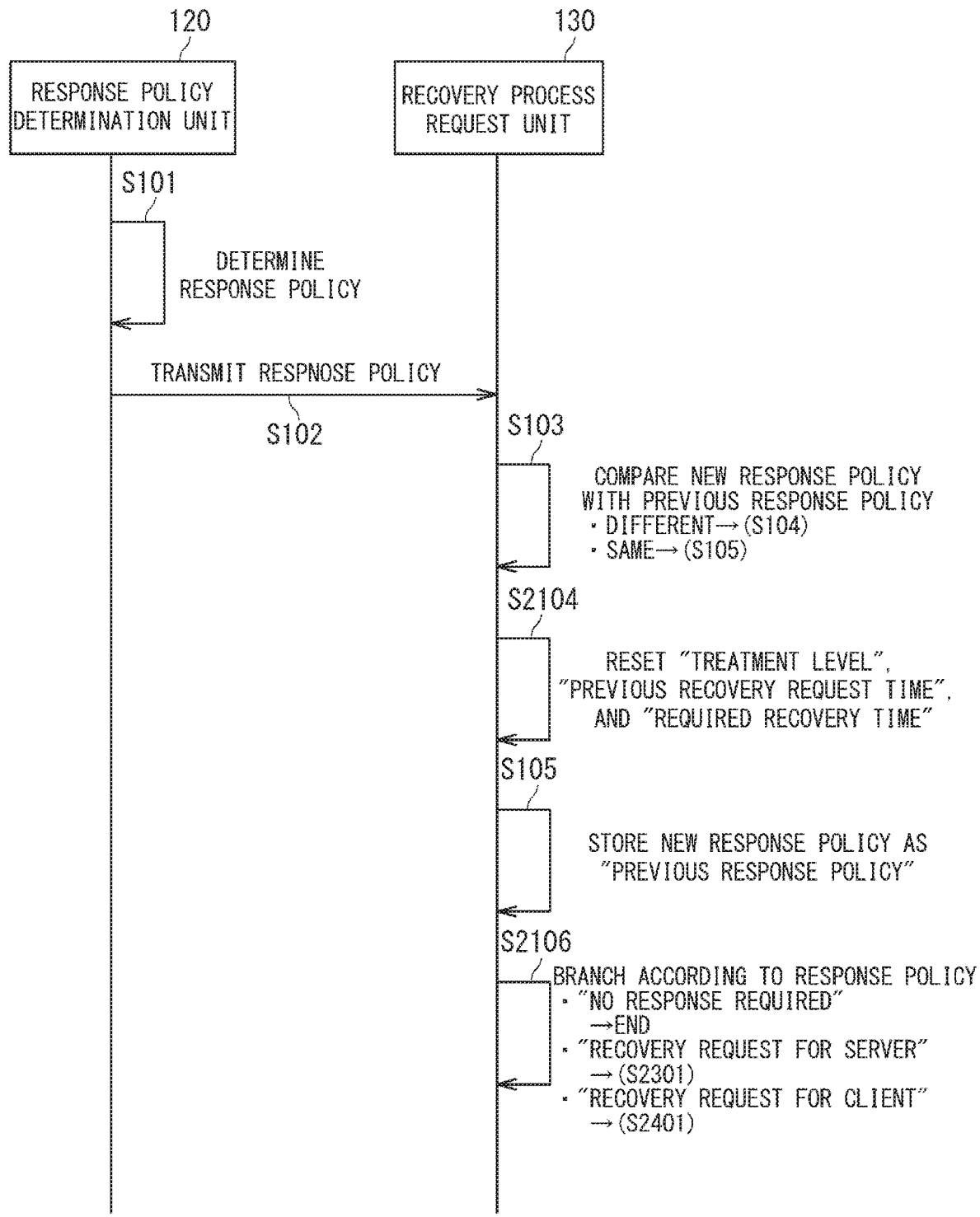
FIG. 24 is a sequence diagram showing an example of determination of a response policy and a request for a recovery process in an abnormal state in the business service providing system according to the third example embodiment.

Next, an operation of the business service providing system 3 according to this example embodiment will be described. The monitoring information shown in FIG. 2 is acquired in the same manner as that in the first example embodiment. FIG. 24 is a sequence diagram showing an example of determination of a response policy and a request for a recovery process in an abnormal state in the business service providing system according to the third example embodiment. FIG. 24 shows the process in which operation content of the process shown in FIG. 3 is modified according to this example embodiment. More specifically, Steps S104 and S106 in FIG. 3 are replaced with Steps S2104 and S2106 in FIG. 24, respectively.

In Step S2104 of FIG. 24, the recovery process request unit 130 resets the stored "treatment level" to 0, and "previous recovery request time" and "required recovery time" to none. In Step S2106, the recovery process request unit 130 determines which of the following steps to proceed in accordance with the newly received response policy. That is, when the received response policy is "Response not required", the process is ended. When the received response policy is "Recovery request for server", the process proceeds to Step S2301. When the received response policy is "Recovery request for client", the process proceeds to Step S2401.

Figure 25:
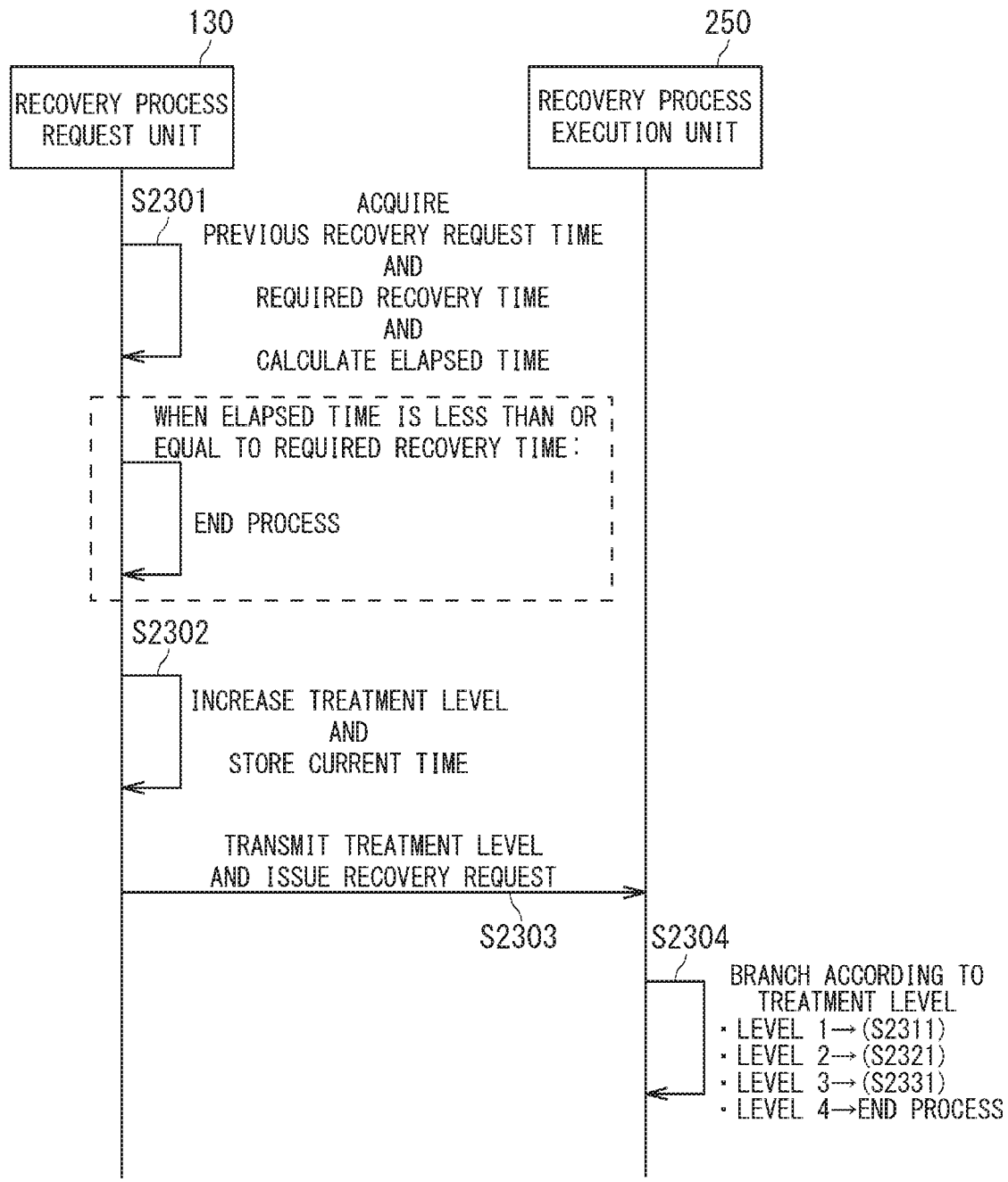
FIG. 25 is a sequence diagram showing an example of a recovery process for a server in the business service providing system according to the third example embodiment.

FIG. 25 is a sequence diagram showing an example of the recovery process for the server in the business service providing system according to the third example embodiment. FIG. 25 shows the process in which operation content of the process shown in FIG. 5 is modified according to this example embodiment. Step S301 in FIG. 5 is replaced with Step S2301 in FIG. 25. The content of Step S2301 is as follows. That is, in Step S2301, the recovery process request unit 130 acquires the "previous recovery request time" and the "required recovery time", compares the "previous recovery request time" with the current time, and calculates an elapsed time. When the elapsed time exceeds the "required recovery time", the process proceeds to Step S2302, whereas when the elapsed time does not exceed the "required recovery time", the process is ended. When there is no "previous recovery request time", it can be determined that it is not necessary to calculate the elapsed time, and the process proceeds to Step S2302. The "required recovery time" is transmitted by the required time communication unit 280 when the previous recovery process is executed.

Steps S2302, S2303, and S2304 in FIG. 25 have the same content as that of Steps S302, S303, and S304 in FIG. 5, respectively. Therefore, as shown in Step S2302, when the elapsed time from the previous recovery request exceeds the required time, the recovery process request unit 130 increases the treatment level by one.

Figure 26:
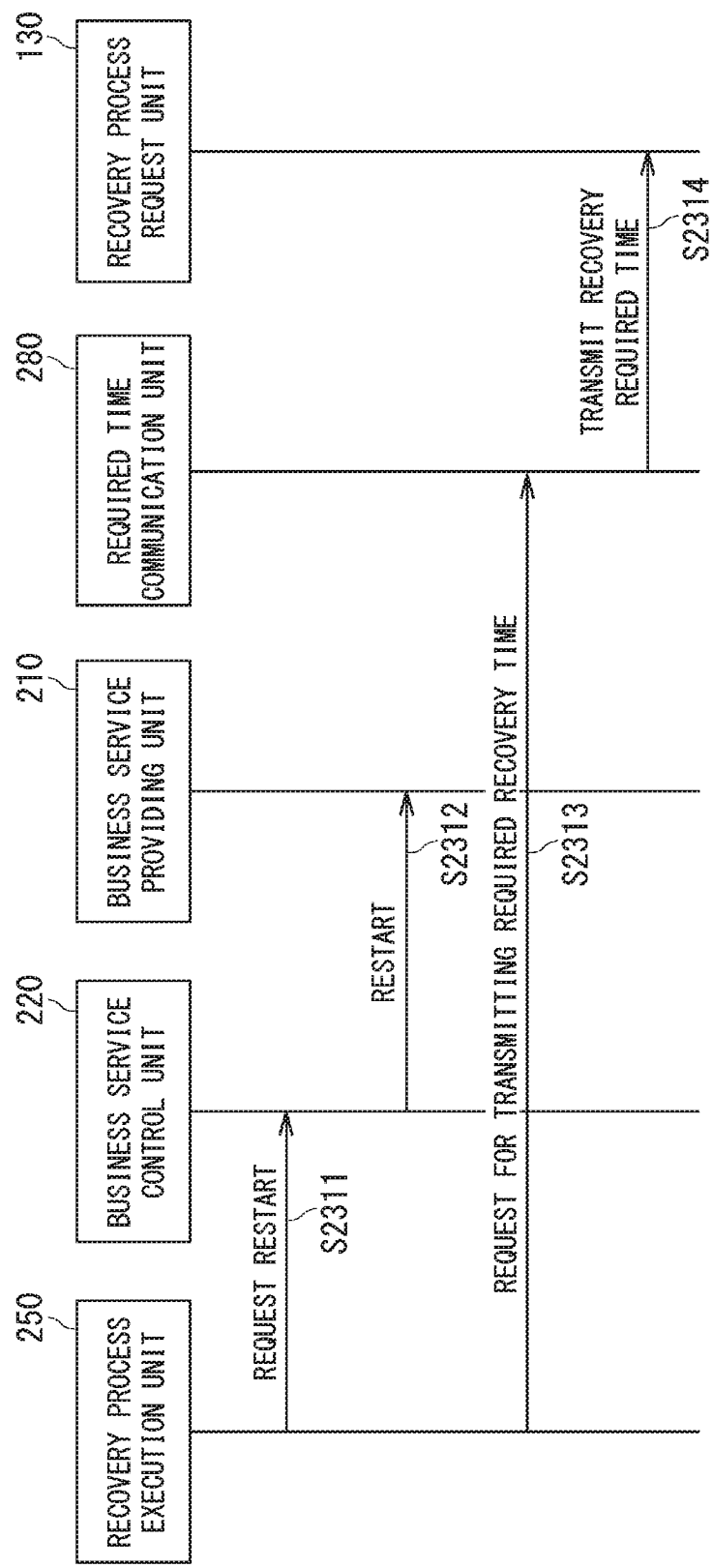
FIG. 26 is an example of a sequence diagram showing an example of a recovery process for a server in the business service providing system according to the third example embodiment.

FIG. 26 is a sequence diagram showing an example of the recovery process for the server in the business service providing system according to the third example embodiment. FIG. 27 shows an example of the recovery process for the server and the required times corresponding to the treatment levels in the business service providing system according to the third example embodiment. FIG. 26 shows the process in which operation content of the process shown in FIG. 7 is modified according to this example embodiment. That is, Steps S2313 and S2314 are further included. Note that Steps S2311 and S2312 in FIG. 26 have the same content as that of Step S311 and S312 in FIG. 7, respectively.

The content of Step S2313 and Step S2314 is as follows. In Step S2313, the recovery process execution unit 250 requests the required time communication unit 280 to transmit the required time until recovery. In response to this request, in Step S2314, the required time communication unit 280 transmits the required time (e.g., 60 seconds) defined for the level 1 of FIG. 27 to the recovery process request unit 130. Then, the required recovery time is set in the recovery process request unit 130.

Figure 28:
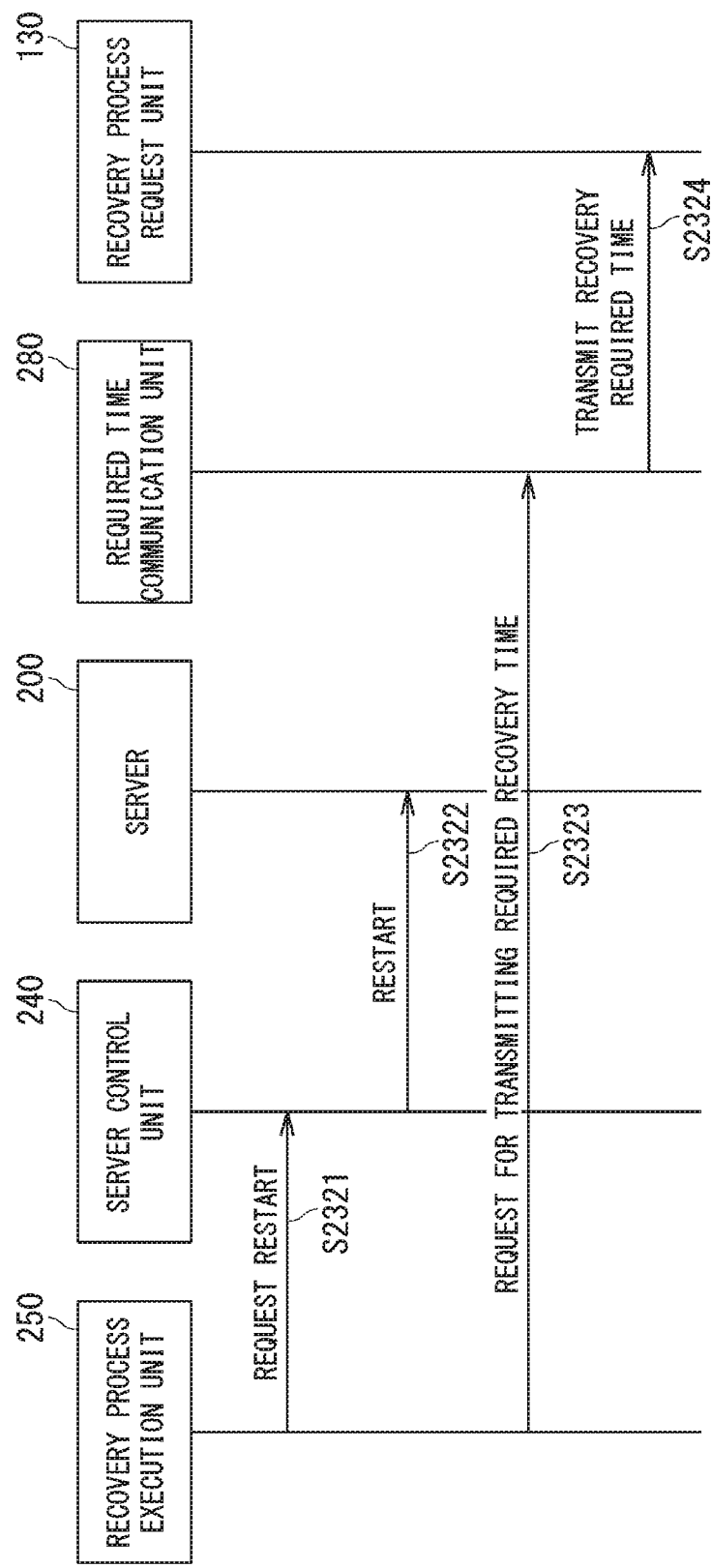
FIG. 28 is a sequence diagram showing an example of a recovery process for a server in the business service providing system according to the third example embodiment.

FIG. 28 is a sequence diagram showing an example of the recovery process for the server in the business service providing system according to the third example embodiment. FIG. 28 shows the process in which operation content of the process shown in FIG. 8 is modified according to this example embodiment. That is, Steps S2323 and S2324 are further included. Note that Steps S2321 and S2322 in FIG. 28 have the same content as that of Steps S321 and S322 in FIG. 8, respectively.

The content of Step S2323 and S2324 is as follows. In Step S2323, the recovery process execution unit 250 requests the required time communication unit 280 to transmit the required time until recovery. In response to this request, in Step S2324, the required time communication unit 280 transmits the required time (e.g., 600 seconds) defined for the level 2 of FIG. 27 to the recovery process request unit 130. Then, the required recovery time is set in the recovery process request unit 130.

Figure 29:
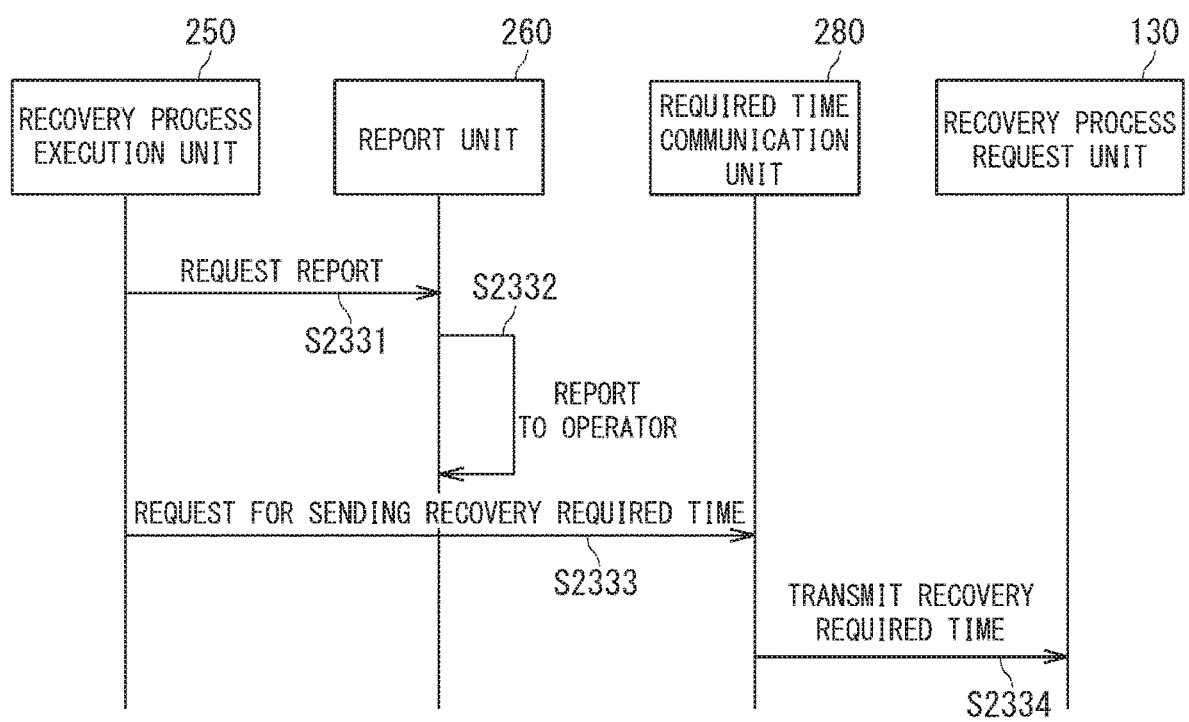
FIG. 29 is a sequence diagram showing an example of a recovery process for a server in the business service providing system according to the third example embodiment.

FIG. 29 is a sequence diagram showing an example of the recovery process for the server in the business service providing system according to the third example embodiment. FIG. 29 shows the process in which operation content of the process shown in FIG. 9 is modified according to this example embodiment. That is, Steps S2333 and S2334 are further included. Note that Steps S2331 and S2332 in FIG. 29 have the same content as that of Steps S331 and S332 in FIG. 9, respectively.

The content of Step S2333 and S2334 is as follows. In Step S2333, the recovery process execution unit 250 requests the required time communication unit 280 to transmit the required time until recovery. In response to this request, as shown in Step S2334, the required time communication unit 280 transmits the required time (e.g., 3600 seconds) defined for the level 3 of FIG. 27 to the recovery process request unit 130. Then, the required recovery time is set in the recovery process request unit 130.

Figure 30:
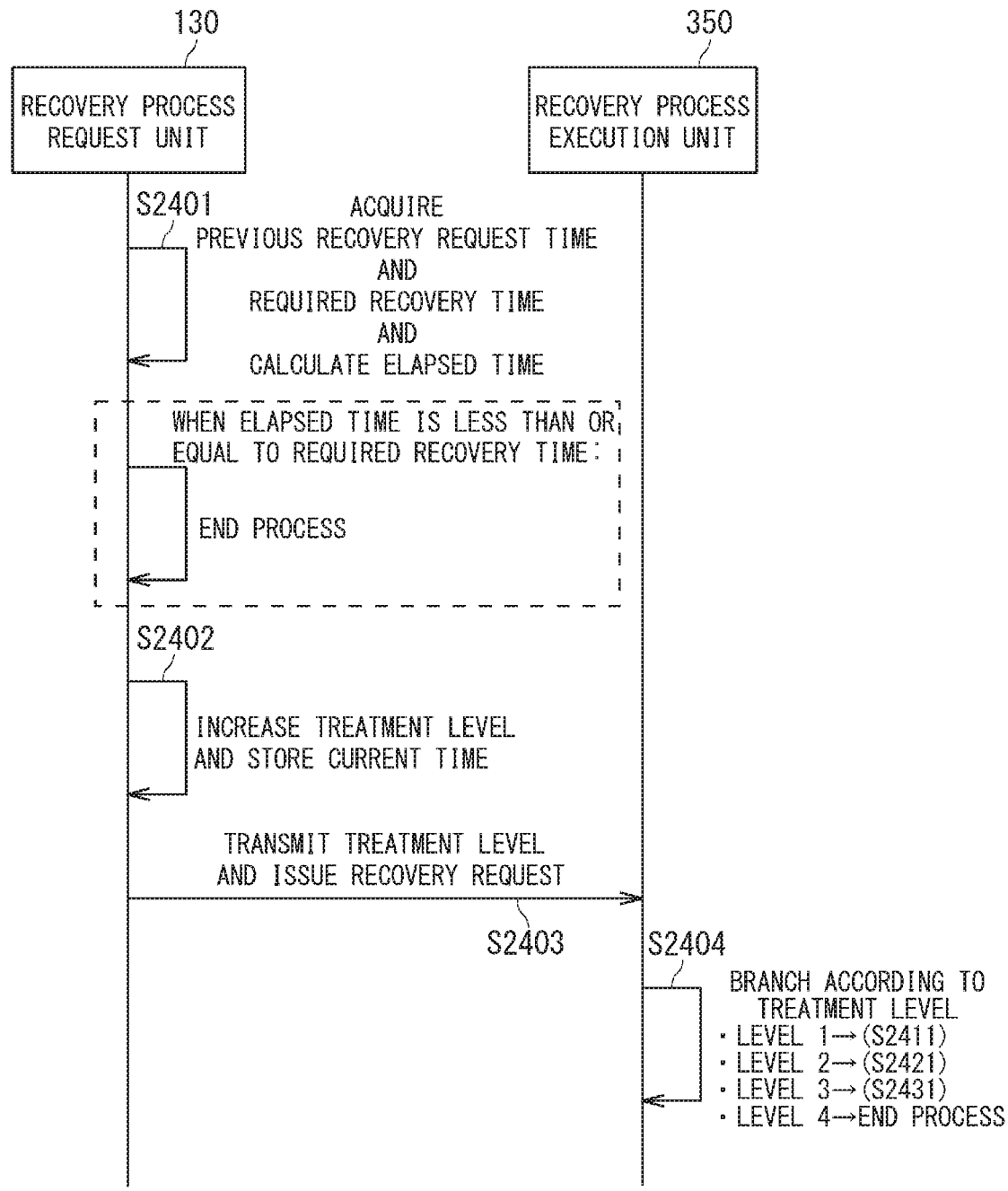
FIG. 30 is a sequence diagram showing an example of a recovery process for a client in the business service providing system according to the third example embodiment.

FIG. 30 is a sequence diagram showing an example of the recovery process for the client in the business service providing system according to the third example embodiment. FIG. 30 shows the process in which operation content of the process shown in FIG. 10 is modified according to this example embodiment. Step S401 in FIG. 10 is replaced with Step S2401 in FIG. 30. The content of Step S2401 is as follows. That is, in Step S2401, the recovery process request unit 130 acquires the "previous recovery request time" and the "required recovery time", compares the "previous recovery request time" with the current time, and calculates an elapsed time. When the elapsed time exceeds the "required recovery time", the process proceeds to Step S2402, whereas when the elapsed time does not exceed the "required recovery time", the process is ended. When there is no "previous recovery request time", it can be determined that it is not necessary to calculate the elapsed time, and the process proceeds to Step S2402.

Steps S2402, S2403, and 2404 in FIG. 30 have the same content as that of Steps S402, S403, and S404 in FIG. 10, respectively. Therefore, as shown in Step S2402, when the elapsed time from the previous recovery request exceeds the required time, the recovery process request unit 130 increases the treatment level by one.

Figure 31:
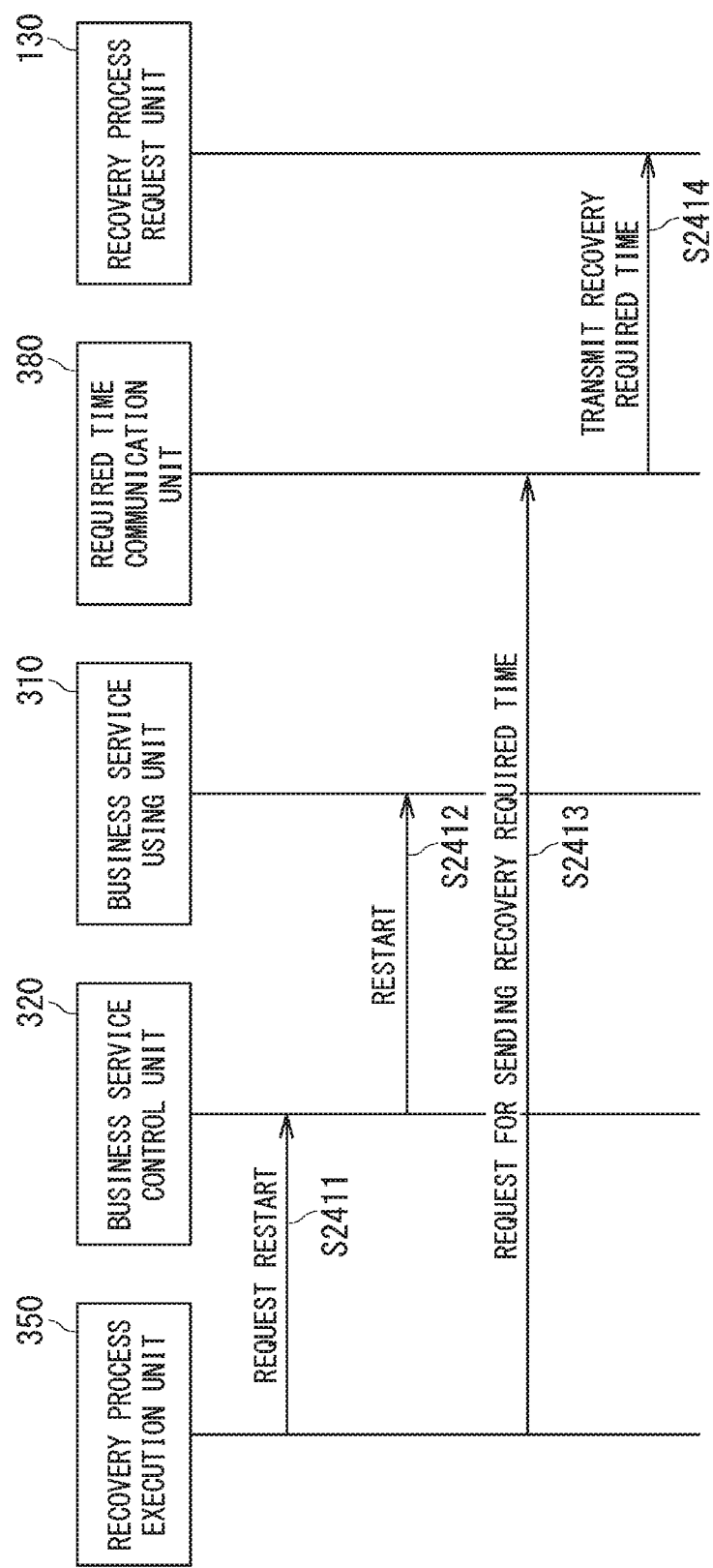
FIG. 31 is a sequence diagram showing an example of a recovery process for a client in the business service providing system according to the third example embodiment.

FIG. 31 is a sequence diagram showing an example of the recovery process for the client in the business service providing system according to the third example embodiment. FIG. 32 shows the recovery process and the required time corresponding to the treatment level in the business service providing system according to the third example embodiment. FIG. 31 shows the process in which operation content of the process shown in FIG. 12 is modified according to this example embodiment. That is, Steps S2413 and S2414 are further included. Note that Steps S2411 and S2412 in FIG. 31 have the same content as that of Steps S411 and S412 in FIG. 12, respectively.

The content of Step S2413 and S2414 is as follows. In Step S2413, the recovery process execution unit 350 requests the required time communication unit 380 to transmit the required time until recovery. In response to this request, in Step S2414, the required time communication unit 380 transmits the required time (e.g., 30 seconds) defined for the level 1 of FIG. 32 to the recovery process request unit 130. Then, the required recovery time is set in the recovery process request unit 130.

Figure 33:
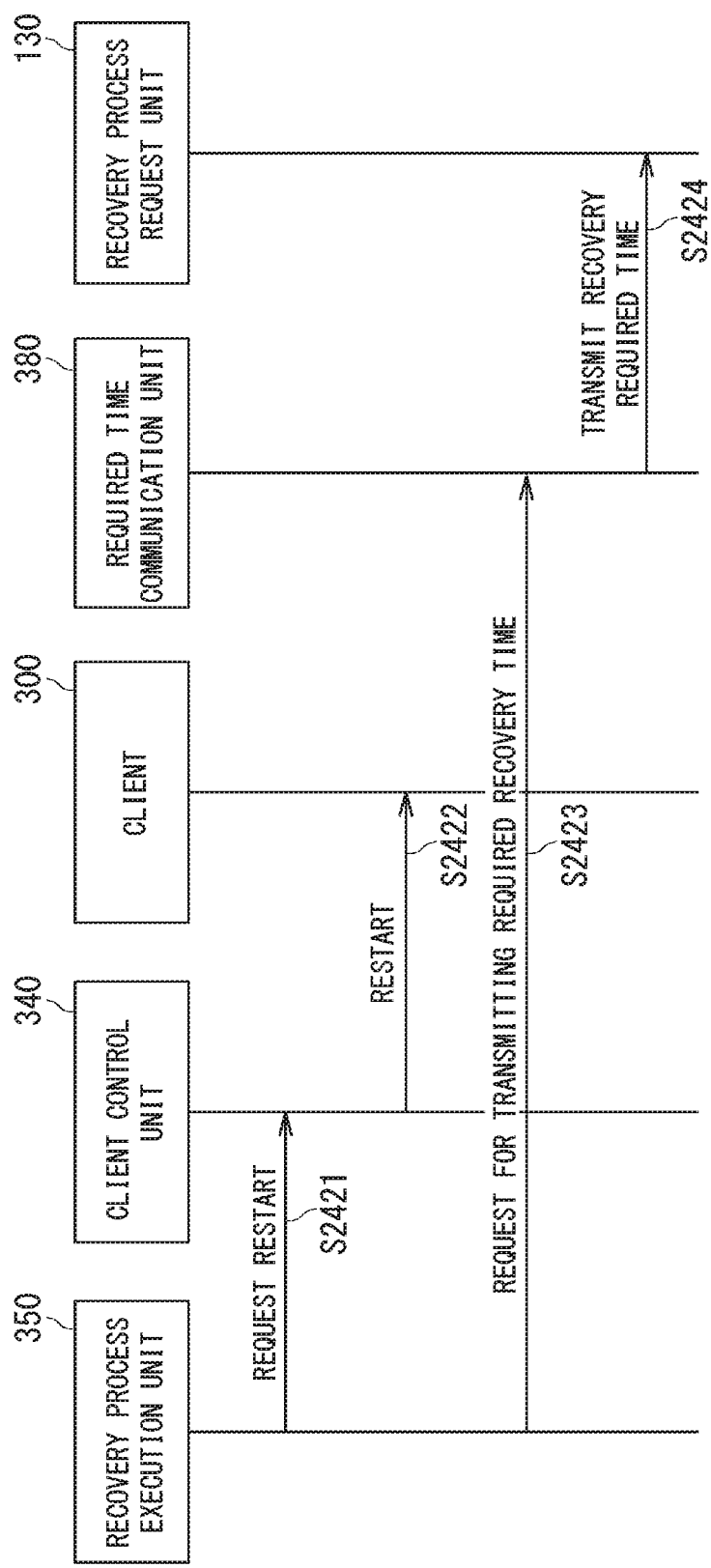
FIG. 33 is a sequence diagram showing an example of a recovery process for a client in the business service providing system according to the third example embodiment.

FIG. 33 is a sequence diagram showing an example of the recovery process for the client in the business service providing system according to the third example embodiment. FIG. 33 shows the process in which operation content of the process shown in FIG. 13 is modified according to this example embodiment. That is, Steps S2423 and S2424 are further included. Note that Steps S2421 and S2422 in FIG. 33 have the same content as that of Steps S421 and S422 in FIG. 13, respectively.

The content of Step S2423 and S2424 is as follows. In Step S2423, the recovery process execution unit 350 requests the required time communication unit 380 to transmit the required time until recovery. In Step S2424, the required time communication unit 380 transmits the required time (e.g., 180 seconds) defined for the level 2 of FIG. 32 to the recovery process request unit 130. Then, the required recovery time is set in the recovery process request unit 130.

Figure 34:
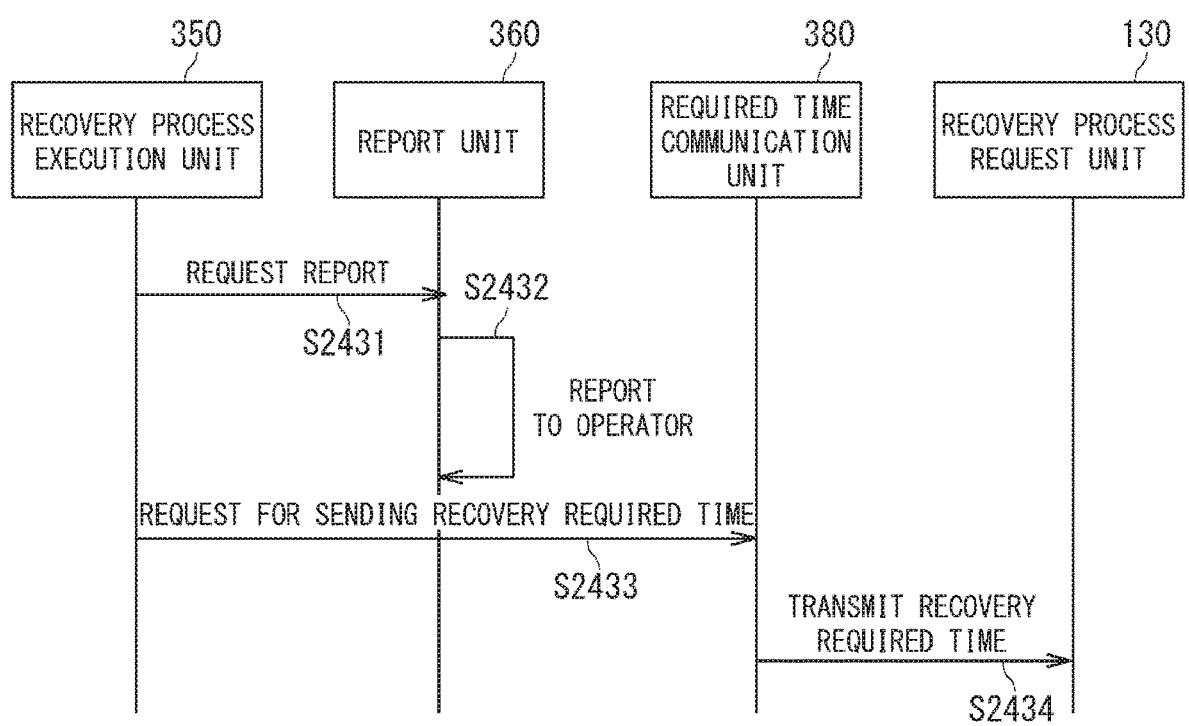
FIG. 34 is a sequence diagram showing an example of a recovery process for a client in the business service providing system according to the third example embodiment.

FIG. 34 is a sequence diagram showing an example of the recovery process for the client in the business service providing system according to the third example embodiment. FIG. 34 shows the process in which operation content of the process shown in FIG. 14 is modified according to this example embodiment. That is, Step S2433 and Step S2434 are further included. Note that Steps S2431 and S2432 in FIG. 34 have the same content as that of Steps S431 and S432 in FIG. 14, respectively.

The content of Step S2433 and S2434 is as follows. That is, in Step S2433, the recovery process execution unit 350 requests the required time communication unit 380 to transmit the required time until recovery. In response to this request, in Step S2434, the required time communication unit 380 transmits the required time (e.g., 3600 seconds) defined for the level 3 of FIG. 32 to the recovery process request unit 130. Then, the required recovery time is set in the recovery process request unit 130.

Next, the effect of this example embodiment will be described. In this example embodiment, the required time can be set for each recovery process. This reduces an unnecessary waiting time when a plurality of recovery processes are executed. Further, by making it possible to set the required time for each recovery process, it is possible to reduce the possibility that the next recovery process may be started before the effect of the previous recovery process is exerted. The configuration, operations, and effects of the third example embodiment other than those described above are described in the first and second example embodiments.

Note that the present disclosure is not limited to the above-described example embodiments, and can be changed as appropriate without departing from the spirit of the present disclosure. For example, a business service providing system and a business service recovery method combining the components according to the first to third example embodiments are also within the scope of the technical idea of the present disclosure. Further, the following business service recovery program that causes a computer to execute the business service recovery method according to the first to third example embodiments is also included in the scope of the technical idea of the example embodiment.

Specifically, a business service recovery program that causes a computer to execute:

acquiring monitoring information indicating a state of a business service in a server apparatus and a client apparatus, the server apparatus providing the business service and the client apparatus using the business service;

determining a response policy for recovery of the business service based on the monitoring information in the server apparatus and the client apparatus; and requesting one of the server apparatus and the client apparatus based on the response policy to perform a process.

According to the above example aspects, it is possible to provide a business service providing system, a business service recovery method, and a business service recovery program that can achieve appropriate monitoring and recovery according to a device in which a failure has occurred even when the failure has occurred in a device other than a server that provides a business service among components constituting the business service.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first, second and third example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A business service providing system comprising:
a server apparatus configured to provide a business service;
a client apparatus configured to use the business service; and
a monitoring apparatus configured to monitor a state of the business service in the server apparatus and the client apparatus, wherein
the monitoring apparatus comprises at least one hardware processor configured to implement:
a acquiring monitoring information indicating the state of the business service in the server apparatus and the client apparatus;
determining a response policy for recovery of the business service based on the monitoring information in the server apparatus and the client apparatus; and
requesting one of the server apparatus and the client apparatus to perform a recovery process based on the response policy;
issuing, when the server apparatus is normal and the client apparatus is abnormal, a first recovery request to the client apparatus;
issuing, when the server apparatus is abnormal and the client apparatus is normal, a second recovery request to the server apparatus;
issuing, when the server apparatus is abnormal and the client apparatus is abnormal, a third recovery request to the server apparatus;
increasing, when the response policy continues, a treatment level of the recovery process from at least one of four levels, comprising a level 1, a level 2, a level 3, and a level 4, of the recovery process to at least one other of the four levels,
wherein the recovery process at the level 1 is set to restart a provision of the business service,
wherein the recovery process at the level 2 is set to restart the server apparatus,
wherein the recovery process at the level 3 is set to report to an operator, and
wherein the recovery process at the level 4 is set to "none".

2. The business service providing system according to claim 1, wherein the client apparatus comprises at least one second hardware processor configured to implement:
enabling a user to use the business service;
controlling a start, a stop, and a restart of the business service in the server apparatus;
controlling a start, a stop, and a restart of the business service in the client apparatus;
sending a report to the operator of the business service; and
determining the recovery process in the client apparatus.

3. The business service providing system according to claim 2, wherein the at least one second hardware processor is further configured to implement:
sending a message to a user of the client apparatus; and requesting performance of a process based on the determined recovery process.

4. The business service providing system according to claim 1, wherein the client apparatus further comprises at least one second hardware processor configured to implement transmitting a required time corresponding to the treatment level to the monitoring apparatus, and is the at least one hardware processor is further configured to implement increasing the treatment level when an elapsed time from a previous recovery request exceeds the required time.

\* \* \* \* \*